United States Patent
Nikitin

(10) Patent No.: US 7,418,469 B2
(45) Date of Patent: Aug. 26, 2008

(54) METHOD AND APPARATUS FOR ADAPTIVE REAL-TIME SIGNAL CONDITIONING, PROCESSING, ANALYSIS, QUANTIFICATION, COMPARISON, AND CONTROL

(76) Inventor: Alexei V. Nikitin, 2131 Quail Creek Dr., Lawrence, KS (US) 66044

( * ) Notice: Subject to any disclaimer, the term of this patent is extended or adjusted under 35 U.S.C. 154(b) by 0 days.

(21) Appl. No.: 11/483,751

(22) Filed: Jul. 10, 2006

(65) Prior Publication Data

US 2006/0253512 A1 Nov. 9, 2006

Related U.S. Application Data

(62) Division of application No. 10/679,164, filed on Oct. 4, 2003, now Pat. No. 7,107,306.

(60) Provisional application No. 60/416,562, filed on Oct. 7, 2003.

(51) Int. Cl.
*G06G 7/02* (2006.01)
(52) U.S. Cl. ..................................... 708/819
(58) Field of Classification Search ................. 708/801, 708/819
See application file for complete search history.

(56) References Cited

U.S. PATENT DOCUMENTS 3,355,736 A * 11/1967 Perper .................. 342/378

(Continued)

FOREIGN PATENT DOCUMENTS

JP     411047131 A     2/1999

(Continued)

OTHER PUBLICATIONS

U.S. Appl. No. 60/194,130, filed Apr. 3, 2000, Nikitin et al.

(Continued)

*Primary Examiner*—Tan V. Mai
(74) *Attorney, Agent, or Firm*—Griffin, Flink, Watson, LLC; Frank B. Flink, Jr. Esq.

(57) ABSTRACT

Various components of the present invention are collectively designated as Adaptive Real-Time Embodiments for Multivariate Investigation of Signals (ARTEMIS). It is a method, processes, and apparatus for measurement and analysis of variables of different type and origin. In this invention, different features of a variable can be quantified either locally as individual events, or on an arbitrary spatio-temporal scale as scalar fields in properly chosen threshold space. The method proposed herein overcomes limitations of the prior art by directly processing the data in real-time in the analog domain, identifying the events of interest so that continuous digitization and digital processing is not required, performing direct, noise-resistant measurements of salient signal characteristics, and outputting a signal proportional to these characteristics that can be digitized without the need for highspeed front-end sampling. The application areas of ARTEMIS are numerous, e.g., it can be used for adaptive content-sentient real-time signal conditioning, processing, analysis, quantification, comparison, and control, and for detection, quantification, and prediction of changes in signals, and can be deployed in automatic and autonomous measurement, information, and control systems. ARTEMIS can be implemented through various physical means in continuous action machines as well as through digital means or computer calculations. Particular embodiments of the invention include various analog as well as digital devices, computer programs, and simulation tools.

12 Claims, 17 Drawing Sheets

U.S. PATENT DOCUMENTS

| | | | |
|---|---|---|---|
| 3,815,042 | A * | 6/1974 | Maunsell et al. ............... 331/11 |
| 4,513,440 | A | 4/1985 | Delman |
| 4,682,230 | A | 7/1987 | Perlman et al. |
| 4,924,226 | A * | 5/1990 | Adams ....................... 341/157 |
| 5,144,568 | A | 9/1992 | Glover |
| 5,315,171 | A | 5/1994 | Blauer et al. |
| 5,384,865 | A | 1/1995 | Loveridge |
| 5,408,675 | A | 4/1995 | Florentino et al. |
| 5,414,472 | A | 5/1995 | Hwang |
| 5,426,785 | A | 6/1995 | Coffield |
| 5,446,501 | A | 8/1995 | Takemoto et al. |
| 5,715,335 | A | 2/1998 | De Haan |
| 5,913,188 | A | 6/1999 | Tzirkel-Hancock |
| 5,995,868 | A | 11/1999 | Dorfmeister et al. |
| 6,058,405 | A | 5/2000 | Kolte et al. |
| 6,121,817 | A | 9/2000 | Yang et al. |
| 6,199,084 | B1 | 3/2001 | Wiseman |
| 6,219,102 | B1 | 4/2001 | Wagner et al. |
| 6,223,083 | B1 | 4/2001 | Rosar |
| 5,467,380 | A1 | 3/2004 | Goldworthy |
| 6,714,670 | B1 | 3/2004 | Goldsworthy et al. |
| 2003/0187605 | A1 | 10/2003 | Mathews et al. |

FOREIGN PATENT DOCUMENTS

| | | | |
|---|---|---|---|
| WO | WO 01/75660 | A1 | 10/2001 |
| WO | WO 03/025512 | A2 | 3/2003 |

OTHER PUBLICATIONS

U.S. Appl. No. 60/223,206, filed Aug. 4, 2000, Nikitin et al.

U.S. Appl. No. 09/921,524, filed Mar. 27, 2003, Nikitin.

Ochoa, E,; Allebach, J.P,;Sweeney, D.W.; Optical Median Filtering Using Threshold Decomposition; Applied Optics; Jan. 15, 1987; pp. 252-260: vol. 26, No. 2; US.

Paul, S.; Huper, K; Analog Rank Filtering; IEEE Transactions on Circuits and Systems—I: Fundamental Theory and Applications; Jul. 7, 1993; pp. 469-476; vol. 40, No. 7.

Urahama, K.; Nagao, T.; Direct Analog Rank Filtering; IEEE Transactions on Circuits and Systems—I: Fundamental Theory and Applications; Jul. 7, 1995; pp. 385-388; vol. 42, No. 7.

Nikitin, A.V.; Davidchack, R.L.; Armstrong, T.P.; The Effect of Pulse Pile-up on Threshold Crossing Rates In A System With A Known Impulse Response; Nuclear Instruments & Methods in Physics Research-Section A; 1998; pp. 1-29; A411; 159-171; Department of Physics and Astronomy, University of Kansas, Lawrence; Kansas, US.

Nikitin, A.V.; Pulse Pileup Effects In Counting Detectors; Ph.D. Thesis; Sep. 1998; Department of Physics and Astronomy, University of Kansas, Lawrence, Kansas, US.

Kebede, S; Kuosmanen, P.; Vainio, O; Astola, J.; Simple Circuit For Implementation Of An Analog Stack Filters; Symposium Article; Tampere University of Technology—Signal Processing Laboratory; May 1994; pp. 1-4; Tampere University of Technology; Finland.

Nicholson, D.R.; Introduction to Plasma Theory; Chapter 3—Plasma Kinetic Theory I: Klimontovich Equation; 1983; pp. 37-44; Krieger Publishing Company.

Nicholson, D.R.; Introduction to Plasma Theory; Chapter4—Plasma Kinetic Theory II: Liouville Equation; 1983; pp. 45-47; Krieger Publishing Company.

Nikitin, A.V.; Davidchack, R.L.; Armstrong, T.P.; Analog multivariate counting analyzers; Nuclear Instruments & Methods in Physics Research-Section A; 2003; pp. 465-480; vol. A496; No. 2-3; Elsevier; Netherlands.

Vlassis, S.; Doris, K.; Siskos, S.; Pitas, I,;Analog implementation of erosion/dilation, median and order statistics filters; Pattern Recognition; pp. 1023-1032; vol. 33; No. 6; Elsevier; Netherlands.

Diaz-Sanchez, A.; Ramirez-Angulo, J.; Lemus-Lopez, J.; Analog Adaptive Median Filters; Analog Integrated Circuits and Signal Processing; 2003; pp. 207-213; vol. 36.; Kluwer; Netherlands.

Ferreira, P.J.S.G.; Sorting Continuous-Time Signals and the Analog Median Filter; IEEE Signal Processing Letters; Oct. 2000; pp. 281-283; vol. 7; No. 10; US.

Cilingiroglu, U.; Dake, L.E.; Rank-Order Filter Design With a Sampled- Analog Multiple-Winners-Take-All Core; IEEE Journal of Solid-State Circuits; Aug. 2002; pp. 978-984; vol. 37, No. 8; US.

* cited by examiner

METHOD AND APPARATUS FOR ADAPTIVE REAL-TIME SIGNAL CONDITIONING, PROCESSING, ANALYSIS, QUANTIFICATION, COMPARISON, AND CONTROL

This application is a divisional of application Ser. No. 10/679,164 and claims the benefit of U.S. provisional application No. 60/416,562, which is incorporated herein by reference in its entirety.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to methods, processes and apparatus for real-time measuring and analysis of variables. In particular, it relates to adaptive real-time signal conditioning, processing, analysis, quantification, comparison, and control. This invention also relates to generic measurement systems and processes, that is, the proposed measuring arrangements are not specially adapted for any specific variables, or to one particular environment. This invention also relates to methods and corresponding apparatus for measuring which extend to different applications and provide results other than instantaneous values of variables. The invention further relates to post-processing analysis of measured variables and to statistical analysis.

BACKGROUND ART

Due to the rapid development of digital technology since the 1950's, the development of analog devices has been essentially squeezed out to the periphery of data acquisition equipment only. It could be argued that the conversion to digital technology is justified by the flexibility, universality, and low cost of modern integrated circuits. However, it usually comes at the price of high complexity of both hardware and software implementations. The added complexity of digital devices stems from the fact that all operations must be reduced to the elemental manipulation of binary quantities using primitive logic gates. Therefore, even such basic operations as integration and differentiation of functions require a very large number of such gates and/or sequential processing of discrete numbers representing the function sampled at many points. The necessity to perform a very large number of elemental operations limits the ability of digital systems to operate in real time and often leads to substantial dead time in the instruments. On the other hand, the same operations can be performed instantly in an analog device by passing the signal representing the function through a simple RC circuit. Further, all digital operations require external power input, while many operations in analog devices can be performed by passive components. Thus analog devices usually consume much less energy, and are more suitable for operation in autonomous conditions, such as mobile communication, space missions, prosthetic devices, etc.

It is widely recognized (see, for example, Paul and Hüper (1993)) that the main obstacle to robust and efficient analog systems often lies in the lack of appropriate analog definitions and the absence of differential equations corresponding to known digital operations. When proper definitions and differential equations are available, analog devices routinely outperform corresponding digital systems, especially in non-linear signal processing (Paul and Hüper, 1993). However, there are many signal processing tasks for which digital algorithms are well known, but corresponding analog operations are hard to reproduce. One example, which is widely recognized to fall within this category, is related to the use of signal processing techniques based on order statistics[1].

[1] See, for example, Arnold et al. (1992) for the definitions and theory of order statistics.

Order statistic (or rank) filters are gaining wide recognition for their ability to provide robust estimates of signal properties and are becoming the filters of choice for applications ranging from epileptic seizure detection (Osorio et al., 1998) to image processing (Kim and Yaroslavsky, 1986). However, since such filters work by sorting, or ordering, a set of measurements their implementation has been constrained to the digital domain. As pointed out by some authors (Paul and Hüper, 1993, for example), the major problem in analog rank processing is the lack of an appropriate differential equation for 'analog sorting'. There have been several attempts to implement such sorting and to build continuous-time rank filters without using delay lines and/or clock circuits. Examples of these efforts include optical rank filters (Ochoa et al., 1987), analog sorting networks (Paul and Hüper, 1993; Opris, 1996), and analog rank selectors based on minimization of a non-linear objective function (Urahama and Nagao, 1995). However, the term 'analog' is often perceived as only 'continuous-time', and thus these efforts fall short of considering the threshold continuity, which is necessary for a truly analog representation of differential sorting operators. Even though Ferreira (2000, 2001) extensively discusses threshold distributions, these distributions are only piecewise-continuous and thus do not allow straightforward introduction of differential operations with respect to threshold.

Nevertheless, fuelled by the need for robust filters that can operate in real time and on a low energy budget, analog implementation of traditionally digital operations has recently gained in popularity aided by the rapid progress in analog Very Large Scale Integration (VLSI) technology (Mead, 1989; Murthy and Swamy, 1992; Kinget and Steyaert, 1997; Lee and Jen, 1993). However, current efforts to implement digital signal processing methods in analog devices still employ an essentially digital philosophy. That is, a continuous signal is passed through a delay line which samples the signal at discrete time intervals. Then the individual samples are processed by a cascade of analog devices that mimic elemental digital operations (Vlassis et al., 2000). Such an approach fails to exploit the main strength of analog processing, which is the ability to perform complex operations in a single step without employing the 'divide and conquer' paradigm of the digital approach.

Perhaps the most common digital waveform device is the analog-to-digital converter (ADC). Among the salient characteristics of ADCs are their sampling frequency, measurement resolution, power dissipation, and system complexity. Sampling frequency is typically dictated by the signal of interest and/or the requirements of the application. As the frequency content of the signal of interest increases and the sampling frequency increases, resolution decreases both in terms of the absolute number of bits available in an ADC and in terms of the effective number of bits (ENOB), or accuracy, of the measurement. Power needs typically increase with increasing sampling frequency. The system complexity is increased if continuous monitoring of an input signal is required (real-time operation). As an example, high-end oscilloscopes can capture fast transient events, but are limited by record length (the number of samples that can be acquired) and dead time (the time required to process, store, or display the samples and then reset for more data acquisition). These limitations affect any data acquisition system in that, as the sampling frequency increases, resources will ultimately be limited at some point in the processing chain. In addition, the higher the acquisition speed, the more negative effects such as clock crosstalk, jitter, and synchronization issues combine to reduce system performance.

It is highly desirable to extract signal characteristics or preprocess data prior to digitization so that the requirements on the ADCs are reduced and higher quality data can be obtained. In the past, one common technique was to use an analog memory to sample a fast signal and then the analog memory would be clocked out at a low speed and digitized with a moderately high resolution ADC. While this technique works, it suffers from significant degradation due to clock feedthrough, non-linear effects of the analog memories chosen, and limited record length. Another technique used is to multiplex a high-speed signal to a number of lower speed but higher resolution ADCs using an interleaved clock. Again, the technique works but never realizes the best performance of a single channel due to the high clock noise and inevitable differences in processing channels.

The introduction of the Analysis of VAriables Through Analog Representation (AVATAR) methodology (see Nikitin and Davidchack (2003a) and U.S. patent application Ser. No. 09/921,524, which are incorporated herein by reference in their entirety) is aimed to address many aspects of modern data acquisition and signal processing tasks by offering solutions that combine the benefits of both digital and analog technology, without the drawbacks of high cost, high complexity, high power consumption, and low reliability. The AVATAR methodology is based on the development of a new mathematical formalism, which takes into consideration the limited precision and inertial properties of real physical measurement systems. Using this formalism, many problems of signal analysis can be expressed in a content-sentient form suitable for analog implementation. Specific devices for a wide variety of signal processing tasks can be built from a few universal processing units. Thus, unlike traditional analog solutions, AVATAR offers a highly modular approach to system design. Most practical applications of AVATAR, however, are far from obvious, and their development requires technical solutions unavailable in the prior art. For example, AVATAR introduces the definitions of analog filters and selectors. Nonetheless, the practical implementations of these filters offered by AVATAR are often unstable and suffer from either lack of accuracy or lack of convergence speed, and thus are unsuitable for real-time processing of nonstationary signals. Another limitation of AVATAR lies in the definition of the threshold filter. Namely, a threshold filter in AVATAR depends only on the difference between the displacement and the input variables, and is expressed as a scalar function of only the displacement variable, which limits the scope of applicability of AVATAR. As another example, the analog counting in AVATAR is introduced through modulated density, and thus the instantaneous counting rate is expressed as a product of a rectified time derivative of the signal and the output of a probe. Even though this definition theoretically allows counting without dead time effect, its practical implementations are cumbersome and inefficient.

DISCLOSURE OF INVENTION

Brief Summary of the Invention

The present invention, collectively designated as Adaptive Real-Time Embodiments for Multivariate Investigation of Signals (ARTEMIS), overcomes the shortcomings of the prior art by directly processing the data in real-time in the analog domain, identifying the events of interest so that continuous digitization and digital processing is not required, performing direct, noise-resistant measurements of the salient signal characteristics, and outputting a signal proportional to these characteristics that can be digitized without the need for high-speed front-end sampling.

In the face of the overwhelming popularity of digital technology, simple analog designs are often overlooked. Yet they often provide much cheaper, faster, and more efficient solutions in applications ranging from mobile communication and medical instrumentation to counting detectors for high-energy physics and space missions. The current invention, collectively designated as Adaptive Real-Time Embodiments for Multivariate Investigation of Signals (ARTEMIS), explores a new mathematical formalism for conducting adaptive content-sentient real-time signal processing, analysis, quantification, comparison, and control, and for detection, quantification, and prediction of changes in signals. The method proposed herein overcomes the limitations of the prior art by directly processing the data in real-time in the analog domain, identifying the events of interest so that continuous digitization and digital processing is not required, performing a direct measurement of the salient signal characteristics such as energy and arrival rate, and outputting a signal proportional to these characteristics that can be digitized without the need for high-speed front-end sampling. In addition, the analog systems can operate without clocks, which reduces the noise introduced into the data.

A simplified diagram illustrating multimodal analog real-time signal processing is shown in FIG. 1. The process comprises the step of Threshold Domain Filtering in combination with at least one of the following steps: (a) Multimodal Pulse Shaping, (b) Analog Rank Filtering, and (c) Analog Counting.

Threshold Domain Filtering is used for separation of the features of interest in a signal from the rest of the signal. In terms of a threshold domain, a 'feature of interest' is either a point inside of the domain, or a point on the boundary of the domain. A typical Threshold Domain Filter can be composed of (asynchronous) comparators and switches, where the comparators operate on the differences between the components of the incoming variable(s) and the corresponding components of the control variable(s). For example, for the domain defined as a product of two ideal comparators represented by the Heaviside unit step function $\theta(x)$, $D=\theta[x(t)-D]\theta[\dot{x}(t)]$ (with two control levels, D and zero), a point inside (that is, $D=1$) corresponds to a positive-slope signal of the magnitude greater than D, and the stationary points of $x(t)$ above the threshold D can be associated with the points on the boundary of this domain.

Multimodal Pulse Shaping can be used for embedding the incoming signal into a threshold space and thus enabling extraction of the features of interest by the Threshold Domain Filtering. A typical Multimodal Pulse Shaper transforms at least one component of the incoming signal into at least two components such that one of these two components is a (partial) derivative of the other. For example, for identification of the signal features associated with the stationary points of a signal x(t), the Multimodal Pulse Shaping is used to output both the signal x(t) and its time derivative $\dot{x}(t)$.

Analog Rank Filtering can be used for establishing and maintaining the analog control levels of the Threshold Domain Filtering. It ensures the adaptivity of the Threshold Domain Filtering to changes in the measurement conditions, and thus the optimal separation of the features of interest from the rest of the signal. For example, the threshold level D in the domain $D=\theta[x(t)-D]\theta[\dot{x}(t)]$ can be established by means of Analog Rank Filtering to separate the stationary points of interest from those caused by noise. Note that the Analog Rank Filtering outputs the control levels indicative of the salient properties of the input signal(s), and thus can be used as a stand-alone embodiment of ARTEMIS for adaptive real-time signal conditioning, processing, analysis, quantification, comparison, and control, and for detection, quantification, and prediction of changes in signals.

Analog Counting can be used for identification and quantification of the crossings of the threshold domain boundaries, and its output(s) can be either the instantaneous rate(s) of these crossings, or the rate(s) in moving window of time. A typical Analog Counter consists of a time-differentiator followed by a rectifier, and an optional time-integrator.

Further scope of the applicability of the invention will be clarified through the detailed description given hereinafter. It should be understood, however, that the specific examples, while indicating preferred embodiments of the invention, are presented for illustration only. Various changes and modifications within the spirit and scope of the invention should become apparent to those skilled in the art from this detailed description. Furthermore, all the mathematical expressions and the examples of hardware implementations are used only as a descriptive language to convey the inventive ideas clearly, and are not limitative of the claimed invention.

TERMS AND DEFINITIONS WITH ILLUSTRATIVE EXAMPLES

For convenience, the essential terms used in the subsequent detailed description of the invention are provided below, along with their definitions adopted for the purpose of this disclosure. Some examples clarifying and illustrating the meaning of the definitions are also provided. Note that the sections and equations in this part are numbered separately from the rest of the disclosure. Additional explanatory information on relevant terms and definitions can be found in U.S. patent application Ser. No. 09/921,524 and U.S. Provisional Patent Application No. 60/416,562, which are incorporated herein by reference in their entirety. Some other terms and their definitions which might appear in this disclosure will be provided in the detailed description of the invention.

D-1 Continuous Comparators and Probes

Figure 1:
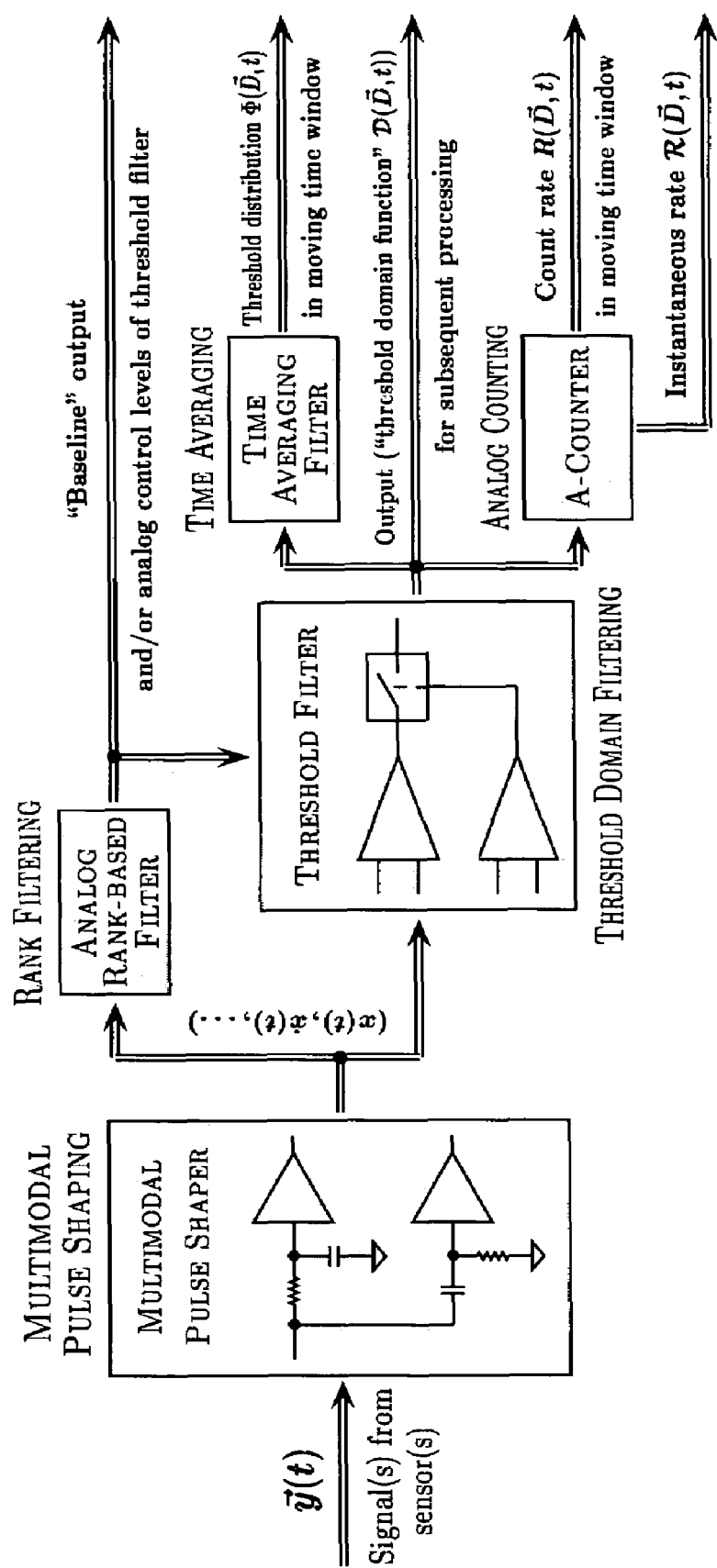
FIG. 1. Simplified diagram of a multimodal analog system for real-time signal processing.
Figure 2:
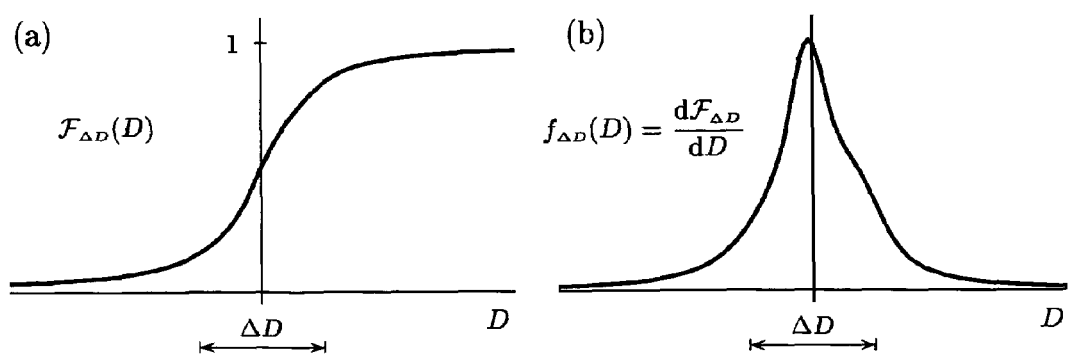
FIG. 2. Representative step (a) and impulse (b) responses of a continuous comparator.

Consider a simple measurement process whereby a signal x(t) is compared to a threshold value D. The ideal measuring device would return '0' or '1' depending on whether x(t) is larger or smaller than D. The output of such a device is represented by the Heaviside unit step function $\theta[D-x(t)]$, which is discontinuous at zero. However, the finite precision of real measurements inevitably introduces uncertainty in the output whenever $x(t) \approx D$. To describe this property of a real measuring device, we represent its output by a continuous function $F_{\Delta D}[D-x(t)]$, where the width parameter $\Delta D$ characterizes the threshold interval over which the function changes from '0' to '1' and, therefore, reflects the measurement precision level. We call $F_{\Delta D}(D)$ the threshold step response of a continuous comparator. Because of the continuity of this function, its derivative $f_{\Delta D}(D)=dF_{\Delta D}/dD$ exists everywhere, and we call it the comparator's threshold impulse response, or a probe (Nikitin et al., 2003; Nikitin and Davidchack, 2003a,b). This threshold continuity of the output of a comparator is the key to a truly analog representation of such a measurement. Examples of step and impulse responses of a continuous comparator are shown in FIG. 2. We further assume, for simplicity, that the probe is a unimodal even function, that is, $f_{AD}(D)$ has only a single maximum and $f_{AD}(D)=f_{AD}(-D)$.

In practice, many different circuits can serve as comparators, since any continuous monotonic function with constant unequal horizontal asymptotes will produce the desired response under appropriate scaling and reflection. It may be simpler to implement a comparator described by an odd function $\tilde{F}_{AD}$ which relates to the response $F_{AD}$ as $$\tilde{F}_{AD} = A(2F_{AD}-1), \tag{D-1}$$

where A is an arbitrary (nonzero) constant. For example, the voltage-current characteristic of a subthreshold transconductance amplifier (Mead, 1989; Urahama and Nagao, 1995) can be described by the hyperbolic tangent function, $\tilde{F}_{AD} = A\tanh(D/\Delta D)$, and thus such an amplifier can serve as a continuous comparator. For specificity, this response function is used in the numerical examples of this disclosure. A practical implementation of the probe $f_{66\ D}$ corresponding to the comparator $F_{AD}$ can be conveniently accomplished as a finite difference $$f_{\Delta D}(D) \approx \frac{\delta \tilde{F}_{\Delta D}(D)}{4A\delta D} = \frac{1}{4A\delta D}[\tilde{F}_{\Delta D}(D+\delta D) - \tilde{F}_{\Delta D}(D-\delta D)], \tag{D-2}$$

where $\delta D$ is a relatively small fraction of $\Delta D$.

Note that the terms 'comparator' and 'discriminator' might be used synonymously in this disclosure.

D-2 Analog Rank Filters (ARFs)

Consider the measuring process in which the difference between the threshold variable D and the scalar signal x(t) is passed through a comparator $F_{AD}$, followed by a linear time averaging filter with a continuous impulse response w(t). The output of this system can be written as $$\Phi(D,t) = w(t) * F_{\Delta D}[D-x(t)], \tag{D-3}$$

where the asterisk denotes convolution. The physical interpretation of the function $\Phi(D,t)$ is the (time dependent) cumulative distribution function of the signal x(t) in the moving time window w(t) (Nikitin and Davidchack, 2003b). In the limit of high resolution (small $\Delta D$), equation (D-3) describes the 'ideal' distribution (Ferreira, 2001). Notice that $\Phi(D,t)$ is viewed as a function of two variables, threshold D and time t, and is continuous in both variables.

The output of a quantile filter of order q in the moving time window w(t) is then given by the function $D_q(t)$ defined implicitly as $$\Phi[D_q(t),t] = q, \quad 0<q<1. \tag{D-4}$$

Figure 3:
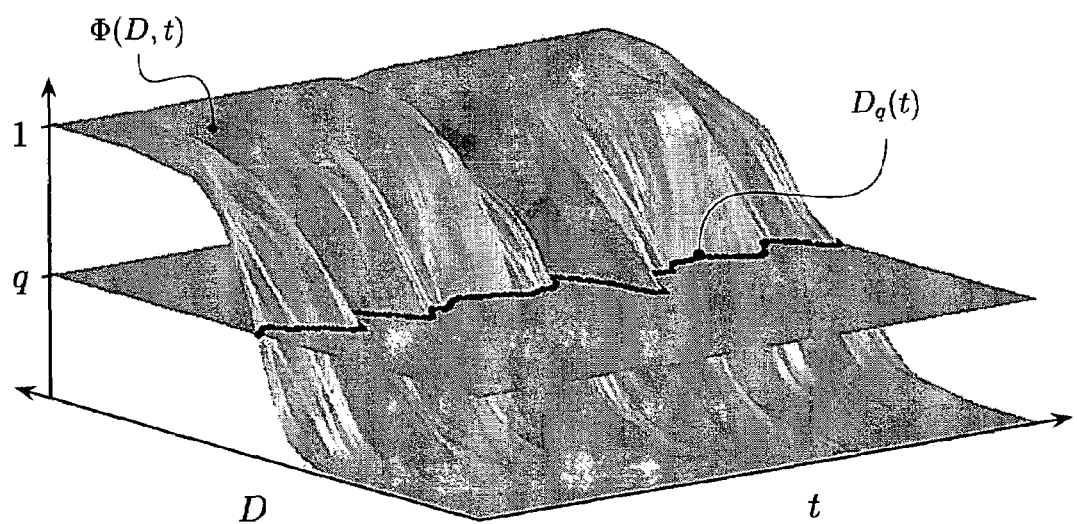
FIG. 3. Defining output $D_q(t)$ of a rank filter as a level curve of the distribution function $\Phi(D,t)$.

Viewing the function $\Phi(D,t)$ as a surface in the three-dimensional space $(t,D,\Phi)$, we immediately have a geometric interpretation of $D_q(t)$ as that of a level (or contour) curve obtained from the intersection of the surface $\Phi=\Phi(D,t)$ with the plane $\Phi=q$, as shown in FIG. 3. Based on this geometric interpretation, one can develop various explicit as well as feedback representations for analog rank filters, including such generalizations as L filters and $\alpha$-trimmed mean filters (Nikitin and Davidchack, 2003b).

Note that the terms analog 'rank', 'quantile', 'percentile', and 'order statistic' filters are often synonymous and might be used alternatively in this disclosure.

D-2.1 Quantile Filters for Modulated Densities

Figure 4:
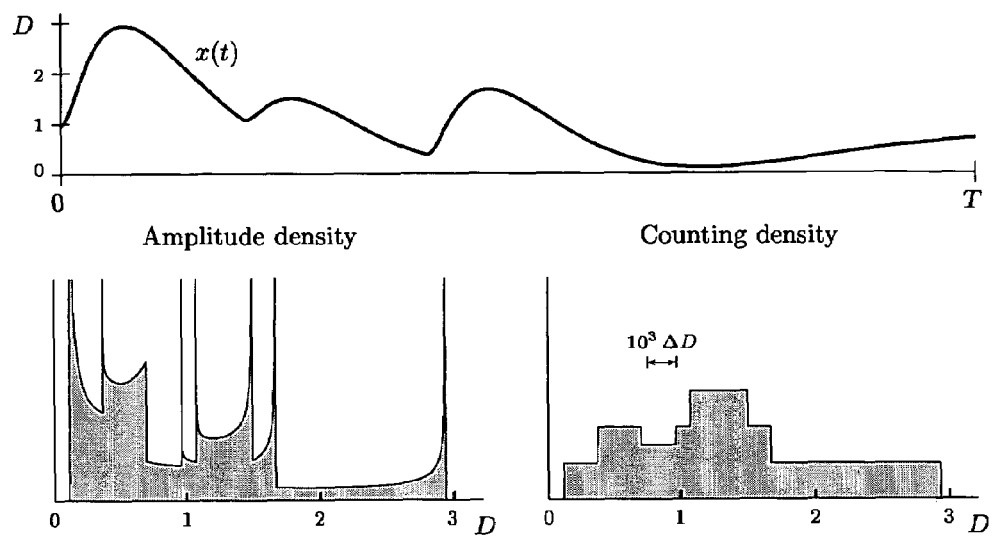
FIG. 4. Amplitude and counting densities computed for the fragment of a signal shown at the top of the figure.

Let us point out (see Nikitin and Davidchack, 2003a,b, for example) that various threshold densities can be viewed as different appearances of a general modulated threshold density (MTD)

$$\phi(D,t) = \frac{w(t) * \{K(t)f_{\Delta D}[D-x(t)]\}}{w(t) * K(t)}, \tag{D-5}$$

where K(t) is a unipolar modulating signal. Various choices of the modulating signal allow us to introduce different types of threshold densities and impose different conditions on these densities. For example, the simple amplitude density is given by the choice K(t)=const, and setting K(t) equal to $|\dot{x}(t)|$ leads to the counting density. The significance of the definition of the time dependent counting (threshold crossing) density arises from the fact that it characterizes the rate of change in the analyzed signal, which is one of the most important characteristics of a dynamic system. Notice that the amplitude density is proportional to the time the signal spends in a vicinity of a certain threshold, while the counting density is proportional to the number of 'visits' to this vicinity by the signal. FIG. 4 shows both the amplitude and counting densities computed for the fragment of a signal shown in the top panel of the figure. Note that the amplitude density has a sharp peak at every signal extremum, while the counting density has a much more regular shape.

An expression for the quantile filter for a modulated density can be written as $$\frac{dD_q}{dt} = \frac{w_T(t) * \{K(t)(q - F_{\Delta D}[D_q - x(t)])\}}{\tau w(t) * \{K(t)f_{\Delta D}[D_q - x(t)]\}}, \tag{D-6}$$

and the physical interpretation of such a filter depends on the nature of the modulating signal. For example, a median filter in a rectangular moving window for $K(t)=|\dot{x}(t)|f_{\Delta Dx}[\dot{x}(t)]$ yields $D_{1/2}(t)$ such that half of the extrema of the signal x(t) in the window are below this threshold.

| SELECTED ACRONYMS AND WHERE THEY FIRST APPEAR | |
|---|---|
| AARF | Adaptive Analog Rank Filter, page 19 |
| AARS | Adaptive Analog Rank Selector, page 25 |
| ARTEMIS | Adaptive Real-Time Embodiments for Multivariate Investigation of Signals, page 4 |
| AVATAR | Analysis of Variables Through Analog Representation, page 3 |
| BASIS | Bimodal Analog Sensor Interface System, page 29 |
| EARL | Explicit Analog Rank Locator, page 26 |
| MTD | Modulated Threshold Density, page 9 |
| SPART | Single Point Analog Rank Tracker, page 24 |
| SELECTED NOTATIONS AND WHERE THEY FIRST APPEAR | |
| $\theta(x)$ | Heaviside unit step function, page 5 |
| $F_{AD}, \tilde{F}_{AD}$ | continuous comparator (discriminator), equation (D-1) on page 8 |
| $D_q(t), D_q(t; T)$ | output of quantile filter of order q, pages 9 and 30 |
| $\mathcal{D}(D, x)$ | threshold domain function, equation (1) on page 12 |

-continued

| | |
|---|---|
| $\|x\|\pm$ | positive/negative component of x, equation (7) on page 14 |
| $\delta(x)$ | Dirac delta function, equation (8) on page 14 |
| $\mathcal{R}(D, t), \mathcal{R}(t)$ | instantaneous counting rate, page 13 and equation (8) on page 14 |
| $R(D, t), R(t)$ | counting rate in moving window of time, page 13 and equation (17) on page 17 |
| $\mathcal{F}_{AD}^{del}$ | delayed comparator, page 21 |
| $\mathcal{F}_{AD}^{ave}$ | averaging comparator, equation (27) on page 23 |

DETAILED DESCRIPTION AND BEST MODE OF THE INVENTION

The Detailed Description of the Invention is organized as follows.

Section 1 (p. 12) provides the definition of the threshold domain function and Threshold Domain Filtering, and explains its usage for feature extraction.

Section 2 (p. 13) deals with quantification of crossings of threshold domain boundaries by means of Analog Counting.

Section 3 (p. 15) introduces Multimodal Pulse Shaping as a way of embedding an incoming signal into a threshold space and thus enabling extraction of the features of interest by the Threshold Domain Filtering. Subsection 3.1 describes Analog Bimodal Coincidence (ABC) counting systems as an example of a real-time signal processing utilizing Threshold Domain Filtering in combination with Analog Counting and Multimodal Pulse Shaping.

Section 4 (p. 18) presents various embodiments of Analog Rank Filters which can be used in ARTEMIS in order to reconcile the conflicting requirements of the robustness and adaptability of the control levels of the Threshold Domain Filtering. Subsection 4.1 describes the Adaptive Analog Rank Filters (AARFs) and Adaptive Analog Rank Selectors (AARSs), while §4.2 introduces the Explicit Analog Rank Locators (EARLs). Subsection 4.3 describes the Bimodal Analog Sensor Interface System (BASIS) as an example of an analog signal processing module operatable as a combination of Threshold Domain Filtering, Analog Counting, and Analog Rank Filtering.

As an additional illustration of ARTEMIS, §5 (p. 32) describes a technique and a circuit for generation of monoenergetic Poissonian pulse trains with adjustable rate and amplitude through a combination of Threshold Domain Filtering and Analog Counting.

1 Threshold Domain Filtering

Threshold Domain Filtering is used for separation of the features of interest in a signal from the rest of the signal. In terms of a threshold domain, a 'feature of interest' is either a point inside of the domain, or a point on the boundary of the domain. In an electrical apparatus, e.g., a typical Threshold Domain Filter can be composed of (asynchronous) comparators and switches, where the comparators operate on the differences between the components of the incoming variable(s) and the corresponding components of the control variable(s). For example, for the domain defined as a product of two ideal comparators represented by the Heaviside unit step function $\theta(x)$, $D=\theta[x(t)-D]\theta[\dot{x}(t)]$ (with two control levels, D and zero), a point inside (that is, D=1) corresponds to a positive-slope signal of the magnitude greater than D, and the stationary points of x(t) above the threshold D can be associated with the points on the boundary of this domain. More generally, as used in the present invention, a Threshold Domain Filter is defined by its mathematical properties regardless of their physical implementation.

Defining threshold domain Let us assume that a continuous signal $y=y(a,t)$ depends on some spatial coordinates a and time t. Thus, in a vicinity of (a,t), this signal can be characterized by its value y(a,t) at this point along with its partial derivatives $\partial y(a,t)/\partial a_i$ and $\partial y(a,t)/\partial t$ at this point. These values (of the signal and its derivatives) can be viewed as coordinates of a point $x=x(a,t)$ in a threshold space, where the vector x consists of the signal y and its various partial derivatives. A particular feature of interest can thus be defined as a certain region in the threshold space as follows.

Let us describe an 'ideal' threshold domain by a (two-level) function D(D,x) such that $$\begin{cases} \mathcal{D}(D, x) = q_1 & \text{if } x \text{ is inside domain} \\ \mathcal{D}(D, x) = q_2 & \text{otherwise} \end{cases}, \quad (1)$$

where D is a vector of the control levels of the threshold filter. Without loss of generality, we can set $q_1=1$ and $q_2=0$. For example, in a physical space, an ideal cuboid with the edge lengths a, b, and c, centered at $(x_0, y_0, z_0)$, can be represented by $$\mathcal{D}(x, y, z) = \theta\left[1 - 4\left(\frac{x-x_0}{a}\right)^2\right]\theta\left[1 - 4\left(\frac{y-y_0}{b}\right)^2\right]\theta\left[1 - 4\left(\frac{z-z_0}{c}\right)^2\right], \quad (2)$$

where we have assumed constant control levels and thus D is a function of x, y, and z only. Note that for a 'real', or 'fuzzy', domain the transition from $q_2$ to $q_1$ happens monotonically over some finite interval (layer) of a characteristic thickness $\Delta\sigma$. The transition to a 'real' threshold domain can be accomplished, for example, by replacing the ideal comparators given be the Heaviside step functions with the 'real' comparators, $\theta \rightarrow F_{AD}$.

Note that an arbitrary threshold domain can be represented by a combination (e.g., polynomial) of several threshold domains. For example, the cuboid given by equation (2) can be viewed as a product of six domains with plane boundaries, or as a product (intersection) of two domains given by the rectangular cylinders $$\mathcal{D}_{xy}(x, y) = \theta\left[1 - 4\left(\frac{x-x_0}{a}\right)^2\right]\theta\left[1 - 4\left(\frac{y-y_0}{b}\right)^2\right] \quad (3)$$

and $$\mathcal{D}_{yz}(y, z) = \theta\left[1 - 4\left(\frac{y-y_0}{b}\right)^2\right]\theta\left[1 - 4\left(\frac{z-z_0}{c}\right)^2\right], \quad (4)$$

$$D(x,y,z) = D_{xy}(x,y)D_{yz}(y,z).$$

Features of a signal In terms of a threshold domain, a 'feature' of a signal is either a point inside of the domain, or a point on the boundary of the domain. For example, for the domain $D=\theta[x(t)-D]\theta[\dot{x}(t)]$ (with two control levels, D and zero), a point inside (that is, D=1) corresponds to a positive-slope signal of the magnitude greater than D, and a point on the boundary of this domain is a stationary point of x(t) above the threshold D.

One should notice that only a small fraction of the signal's trajectory might fall inside of the threshold domain, and thus the duration of the feature might be only a small fraction of the total duration of the signal, especially if a feature is defined as a point on the domain's boundary. Therefore, it is impractical to continuously digitize the signal in order to extract the desired short-duration features. To resolve this, ARTEMIS utilizes an analog technique for extraction and quantification of the salient signal features.

2 Analog Counting

In its simplest form, analog counting consists of three steps: (1) time-differentiation, (2) rectification, and (3) integration. The result of step 2 (rectification) is the instantaneous count rate R(D,t), and step 3 (integration) outputs the count rate R(D,t) in a moving window of time w(t), R(D,t)=w(t)*R(D,t).

Counting crossings of threshold domain boundaries The number of crossings of the boundaries of a domain D by a point following the trajectory x(t) during the time interval [0,T] can be written as $$N = \int_0^T dt \left| \frac{d}{dt} \mathcal{D}[D, x(t)] \right| \quad (5)$$

for the total number of crossings, or $$N_\pm = \int_0^T dt \left| \frac{d}{dt} \mathcal{D}[D, x(t)] \right|_\pm \quad (6)$$

for the number of entries (+) or exits (−). In equation (6), $|x|_\pm$ denotes positive/negative component of x, $$|x|_\pm = \frac{1}{2}(|x| \pm x). \quad (7)$$

Instantaneous count rates Note that the integrands in equations (5) and (6) represent the instantaneous rates of crossings of the domain boundaries, $$\mathcal{R}(t) = \sum_i \delta(t - t_i), \quad (8)$$

where δ(t) is the Dirac delta function, and $t_i$ are the instances of the crossings. It should be easy to see that a number of other useful characteristics of the behavior of the signal inside the domain can be obtained based on the domain definition given by equation (1).

Consider, for example, a threshold domain D in a physical space given by a product (intersection) of two fields of view (e.g., solid angles) of two lidars[2] or cameras. When an object following the trajectory x(t) is in a field of view, the signal is '1'. Otherwise, it is '0'. Then the product of the signals from both lidars (cameras) is given by D[D,x(t)], and the counting of the crossings of the domain boundaries by the object can be performed by an apparatus implementing equations (5) or (6). The following characteristics of the object's motion though the domain are also useful and easily obtained: The time spent inside the domain, $$t = \int_0^T dt D[D, x(t)], \quad (9)$$

the distance traveled inside the domain, $$s = \int_0^T dt \, |\dot{x}(t)| D[D, x(t)], \quad (10)$$

and the average speed inside the domain, $$\bar{v} = \frac{s}{t} = \frac{\int_0^T dt |\dot{x}(t)| \mathcal{D}[D, x(t)]}{\int_0^T dt \mathcal{D}[x(t)]}. \quad (11)$$

*Here LIDAR is an acronym for "LIght Detector And Ranger".

When using the 'real' comparators in a threshold filter and 'real' differentiators in an analog counter, the main property of the 'real' instantaneous rate R(t) is $$\lim_{\Delta D \to 0} \lim_{\delta t \to 0} \mathcal{R}(t) = \sum_i \delta(t - t_i), \quad (12)$$

where ΔD and δt are the width and the delay parameters of the comparators and differentiators, respectively. The property given by equation (12) determines the main uses of the instantaneous rate. For example, multiplication of the latter by a signal x(t) amounts to sampling this signal at the times of occurrence of the events $t_i$. Other temporal characteristics of the events can be constructed by time averaging various products of the signal with the instantaneous rate.

Count rate in a moving window of time Count rate in a moving window of time $w_T(t)$ is obtained through the integration of the instantaneous rate by an integrator with an impulse response $w_T(t)$, namely as $$R(D,t) = w_T(t) * R(D,t). \quad (13)$$

Although there is effectively no difference between averaging window functions which rise from zero to a peak and then fall again, boxcar averaging is deeply engraved in modern engineering, partially due to the ease of interpretation and numerical computations. Thus one of the requirements for counting with a non-boxcar window is that the results of such measurements are comparable with boxcar counting. As an example, let us consider averaging of the instantaneous rates by a sequence of n RC-integrators. For simplicity, let us assume that these integrators have identical time constants τ=RC, and thus their combined impulse response is $$w_n(t) = \frac{t^{n-1}}{(n-1)!\tau^n} e^{-t/\tau} \theta(t). \quad (14)$$

Comparability with a boxcar function of the width T can be achieved by equating the first two moments of the respective weighting functions. Thus a sequence of n RC-integrators with identical time constants $$\tau = \frac{1}{2}T/\sqrt{3n}$$

will provide us with rate measurements corresponding to the time averaging with a rectangular moving window of width T.³

*Of course one can design different criteria for equivalence of the boxcar weighting function and w(t). In our example we were simply looking for the width parameter of w(t) which would allow us to interpret the rate measurements with this function as 'a number of events per time interval T'.

Figure 5:
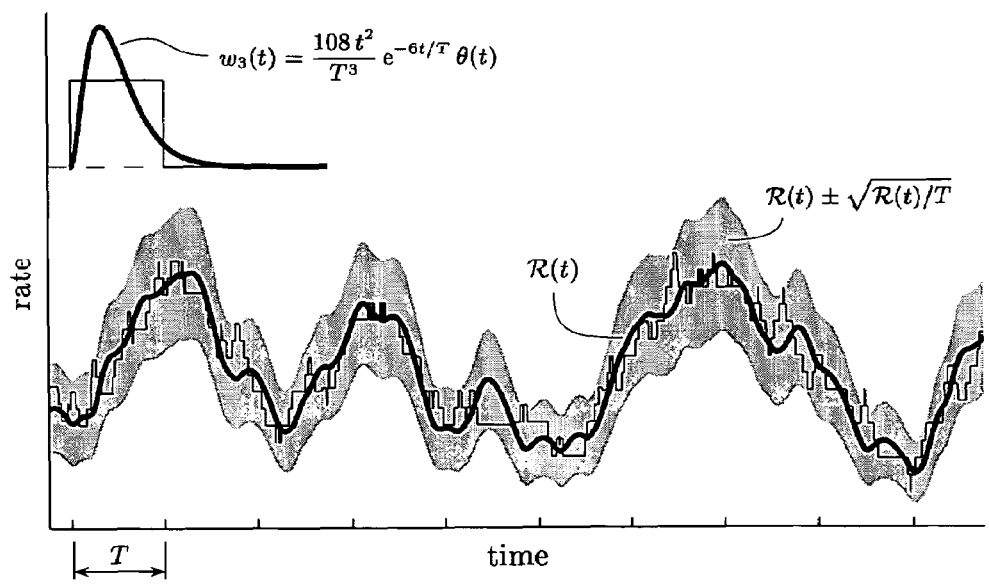
FIG. 5. Comparison of the rates measured with the boxcar (thin solid line) and the 'triple-integrator' test function (n=3 in equation (14), thick line) with $\tau=T/6$. The respective test functions are shown in the upper left corner of the figure.

FIG. 5 compares the moving window rates measured with the boxcar (thin solid line) and the 'triple-integrator' test function (n=3 in equation (14), thick line) with $\tau$=T/6. The respective test functions are shown in the upper left corner of the figure. The gray band in the figure outlines the error interval in the rate measurements as the square root of the total number of counts in the time interval T per this interval.

One of the obvious shortcomings of boxcar averaging is that it does not allow meaningful differentiation of counting rates, while knowledge of time derivatives of the event occurrence rate is important for all physical models where such rate is a time-dependent parameter. Indeed, the time derivative of the rate measured with a boxcar function of width T is simply $T^{-1}$ times the difference between the 'original' instantaneous pulse train and this pulse train delayed by T, and such representation of the rate derivative hardly provides physical insights. On the other hand, the time derivative of the 'cascaded integrators' weighting function $w_n$ given by equation (14) is the bipolar pulse $\dot{w}_n = \tau^{-1}(w_{n-1} - w_n)$, and thus the time derivative of the rate evaluated with $w_n(t)$ is a measure of the 'disbalance' of the rates within the moving window (positive for a 'front-loaded' sample, and negative otherwise).

3 Multimodal Pulse Shaping

In order to focus upon characteristics of interest, feature definition may require knowledge of the (partial) derivatives of the signal. For example, in order to count the extrema in a signal x(t), one needs to have access to the time derivative of the signal, $\dot{x}(t)$. A typical Multimodal Pulse Shaper in the present invention transforms at least one component of the incoming signal into at least two components such that one of these two components is a (partial) derivative of the other, and thus Multimodal Pulse Shaping can be used for embedding the incoming signal into a threshold space and enabling extraction of the features of interest by the Threshold Domain Filtering.

Note, however, that differentiation performed by any physical differentiator is not accurate. For example, a time derivative of $f(t)$ obtained by an RC differentiator is proportional to $[e^{-t/\tau}\theta(t)]*f(t)$, where $\tau$=RC, not to $f(t)$. Thus Multimodal Pulse Shaping does not attempt to straightforwardly differentiate the incoming signal. Instead, it processes an incoming signal in parallel channels to obtain the necessary relations between the components of the output signal. For example, if x(a,t) is a result of shaping the signal y(a,t) by the first channel of a pulse shaper with the impulse response f(a,t), $$x(a,t) = f(a,t)*y(a,t), \quad (15)$$

then the derivatives of x can be obtained as $$\dot{x}(a,t) = \dot{f}*y(a,t) \text{ and } \frac{\partial}{\partial a_i}x(a,t) = \frac{\partial f}{\partial a_i}*y(a,t). \quad (16)$$

Thus Multimodal Pulse Shaping will be achieved if the impulse responses of various channels in the pulse shaper relate as the respective derivatives of the impulse response of the first channel.

Figure 6:
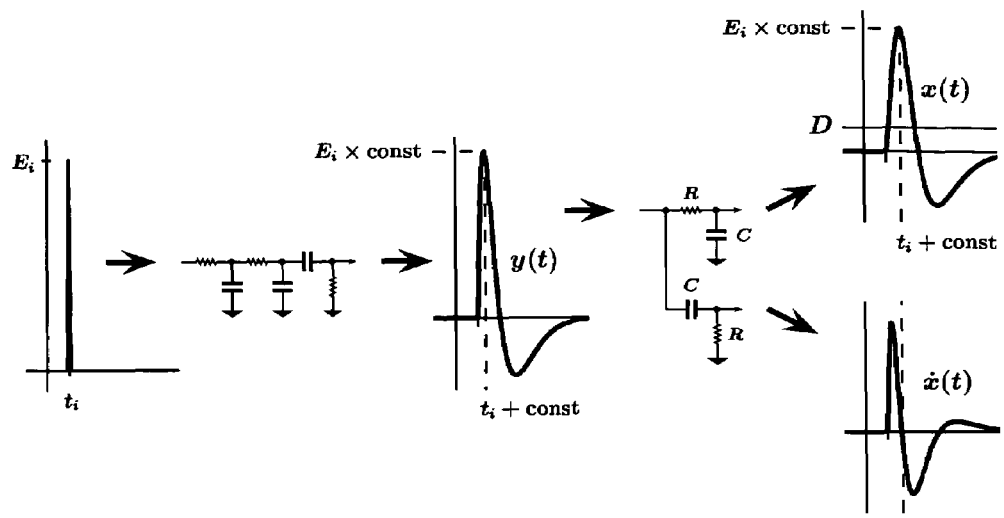
FIG. 6. Illustration of bimodal pulse shaping used for the amplitude and timing measurements of a short-duration event.

FIG. 6 shows an example of bimodal pulse shaping which can be used for both the amplitude and timing measurements of a short-duration event. An event of magnitude $E_i$ and arrival time $t_i$ is passed through an RC pulse shaping network, producing a continuous signal x(t). The event can be fully characterized, e.g., by the first extremum of x(t), since the height of the extremum is proportional to $E_i$, and its position in time is delayed by a constant with respect to $t_i$. By replacing an RC integrator in the shaping network by an RC differentiator with the same time constant, one can obtain an accurate time derivative of x(t). Now the event can be associated with the inbound crossing of the boundary of the threshold domain D=$\theta[x(t)-D]\theta[-\dot{x}(t)]$, where the threshold D is set at a positive value to eliminate the rest of the signal's stationary points.

3.1 Example: Analog Bimodal Coincidence (ABC) Counting Systems

Let us illustrate the usage of a threshold filter, in combination with multimodal pulse shaping and analog counting, in a signal processing module for a two-detector charged particle telescope. This module is an example of an Analog Bimodal Coincidence (ABC) counting system.

In our approach, we relate the short-duration particle events to certain stationary points (e.g., local maxima) of a relatively slow analog signal. Those points can be accurately identified and characterized if the time derivative of the signal is available. Thus the essence of ABC counting systems is in the use of multiple signal characteristics—here a signal and its time derivative—and signals from multiple sensors in coincidence to achieve accuracy in both the amplitude and timing measurements while using low-speed, analog signal processing circuitry. This allows us to improve both the engineering aspects of the instrumentation and the quality of the scientific data.

Figure 7:
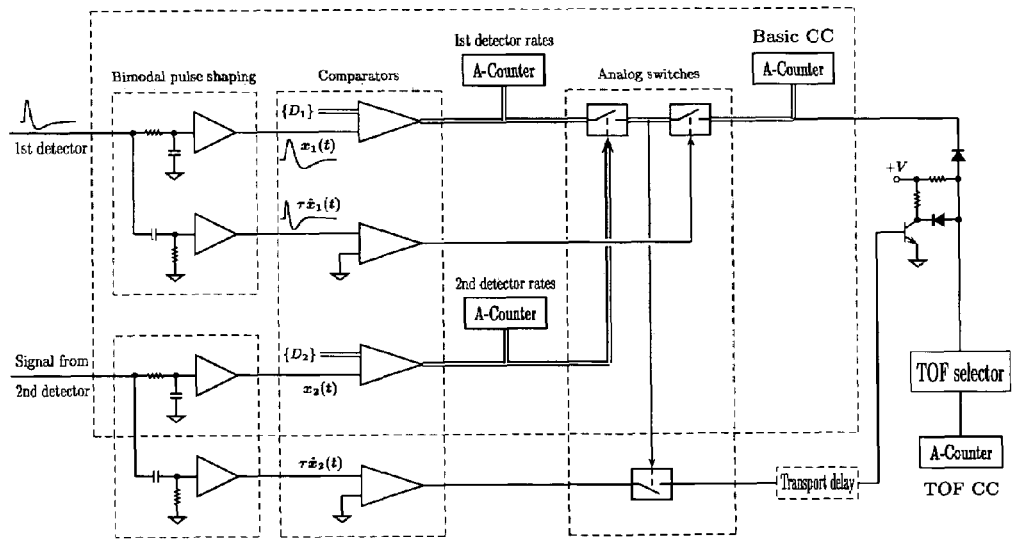
FIG. 7. A simplified principal schematic of a signal processing system for a two-detector particle telescope.

A simplified schematic of the module is shown in FIG. 7. A bimodal pulse shaping is used to obtain an accurate time derivative of the signal from a detector. Comparators are used to obtain two-level signals with the transitions at appropriate threshold crossings (e.g., zero crossings for the derivative signal). Simple asynchronous analog switches are used to obtain the products of the comparators' outputs suitable for appropriate conditional and coincidence counting. The comparators and the analog switches constitute the threshold domain filter with the thresholds $\{D_1\}$, $\{D_2\}$, and the grounds as the control levels. A-Counters are employed for counting the crossings of the threshold domains' boundaries. In its simplest form, an A-Counter is a differentiating circuit (such as a simple RC-differentiator) with a relatively small time constant (in order to keep the dead-time losses small), followed by a precision diode and an integrator with a large time constant (at least an order of magnitude larger than the inverted smallest rate to be measured). A TOF selector employs an additional pulse shaping amplifier, and a pair of comparators with the levels corresponding to the smallest and the largest time of flight.

Bimodal pulse shaping and instantaneous rate of signal's maxima When the time derivative of a signal is available, we can relate the particle events to local maxima of the signal and accurately identify these events. Thus bimodal pulse shaping is the key to the high timing accuracy of the module. As shown in FIG. 7, a bimodal pulse shaping unit outputs two signals, where the second signal is proportional to an accurate time derivative of the first output. The rate R(t), in the moving window of time $w_T(t)$, of a signal's maxima above the threshold D can be expressed as $$R(t) = w_T(t) * \left. \left| \frac{d}{dt} \{\theta[x(t) - D]\theta[\dot{x}(t)]\} \right| \right|_+, \quad (17)$$

where $|y|_+$ denotes the positive part of y (see equation (7)), $\theta$ is the Heaviside unit step function, and the asterisk denotes convolution. Equation (17) represents an idealization of the measuring scheme consisting of the following steps: (i) the first output of the bimodal pulse shaping unit is passed through a comparator set at level D, and the second output—through a comparator set at zero level; (ii) the product of the outputs of the comparators is differentiated, (iii) rectified by a (precision) diode, and (iv) integrated on a time scale T (by an integrator with the impulse response $w_T(t)$). Note that steps (ii) through (iv) represent passing the product of the comparators through an A-Counter. Also note that the output of step (iii) is the instantaneous rate of the signal's maxima above threshold D.

Basic coincidence counting For basic coincidence counting, the coincident rate $R_c(t)$ can be written as $$R_c(t) = w_T(t) * \left. \left| \frac{d}{dt} \{\theta[x_1(t) - D_1]\theta[-\dot{x}_1(t)]\theta[x_2(t) - D_2]\} \right| \right|_+, \quad (18)$$

where the notations are as in equation (17). One can see that equation (18) differs from equation (17) only by an additional term in the product of the comparators' outputs.

Figure 8:
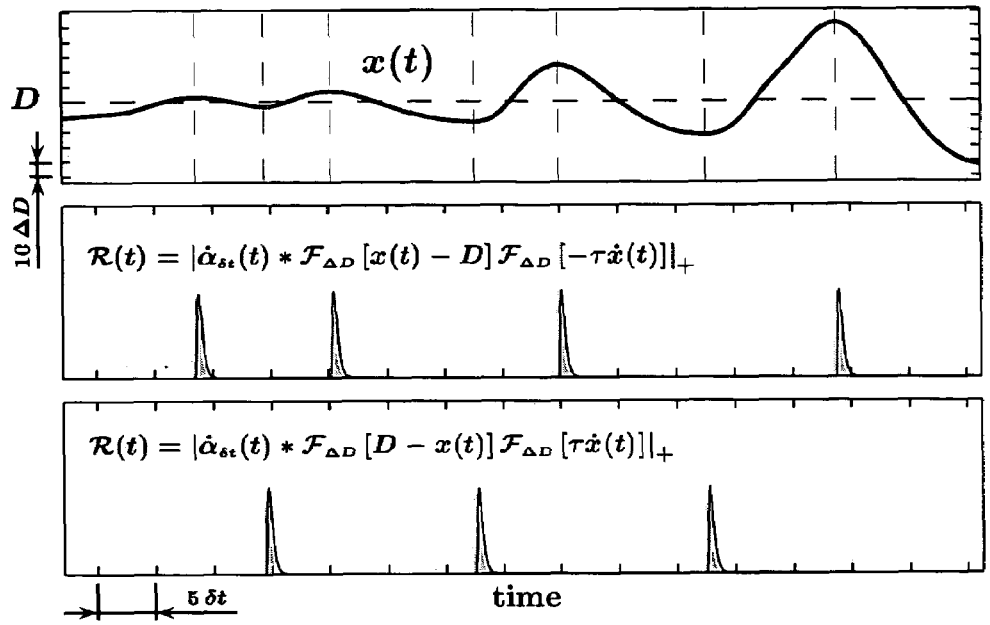
FIG. 8. Example of analog measurement of instantaneous rate of signal's extrema.
Figure 9:
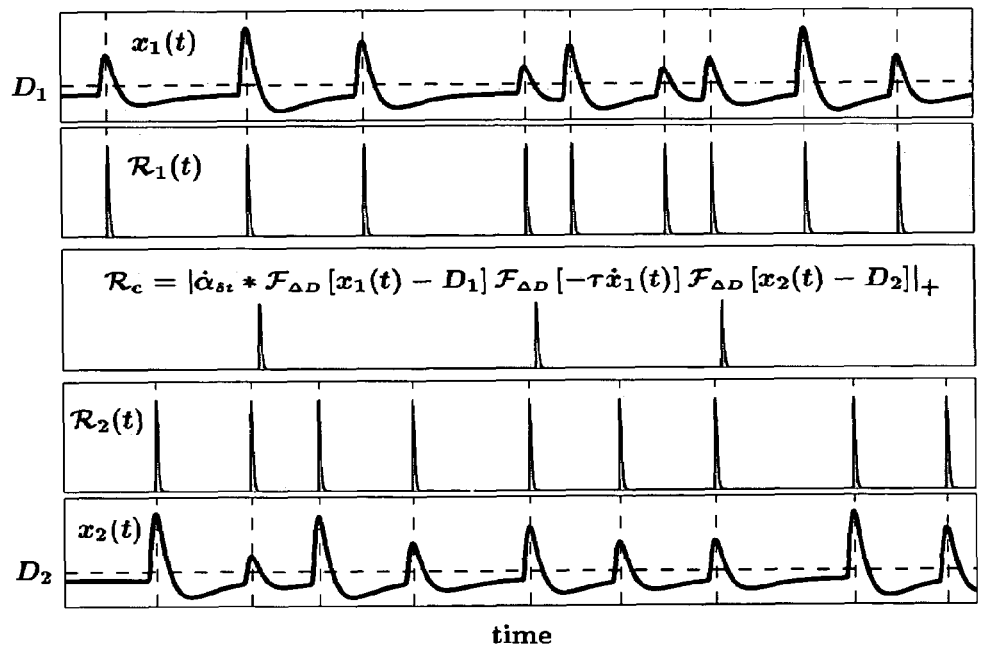
FIG. 9. Example of analog counting of coincident maxima.

Transition to realistic model of measurements It can be easily seen that equations (17) and (18) do not correctly represent any practical measuring scheme implementable in hardware. For example, both equations contain derivatives of discontinuous Heaviside functions, and thus instantaneous rates are expressed through singular Dirac $\delta$-functions. To make a transition from an ideal measurement scheme to a more realistic model, we replace the Heaviside step functions by 'real' discriminators $(\theta(x) \rightarrow \alpha_{\delta t}(t) * F_{AD}(x))$, where $\alpha_{\delta t}(t)$ is a continuous kernel such that $\int_{-\infty}^{\infty} dt \alpha_{\delta t}(t) = 1$), and perform differentiation through a continuous kernel $$\left( \frac{d}{dt} \ldots \rightarrow \dot{\alpha}_{\delta t}(t) * \ldots \right),$$

etc. We choose appropriate functional representations of $F_{AD}$, $\alpha_{\delta t}(t)$, etc., for various elements of a schematic, and also add appropriate noise sources such as thermal noise at all intermediate measuring steps. FIGS. 8 and 9 illustrate such realistic measurements of instantaneous rates of extrema and coincident maxima, respectively. Notice that, in both figures, an event is represented by a narrow peak of a prespecified area in the instantaneous rates.

Figure 10A:
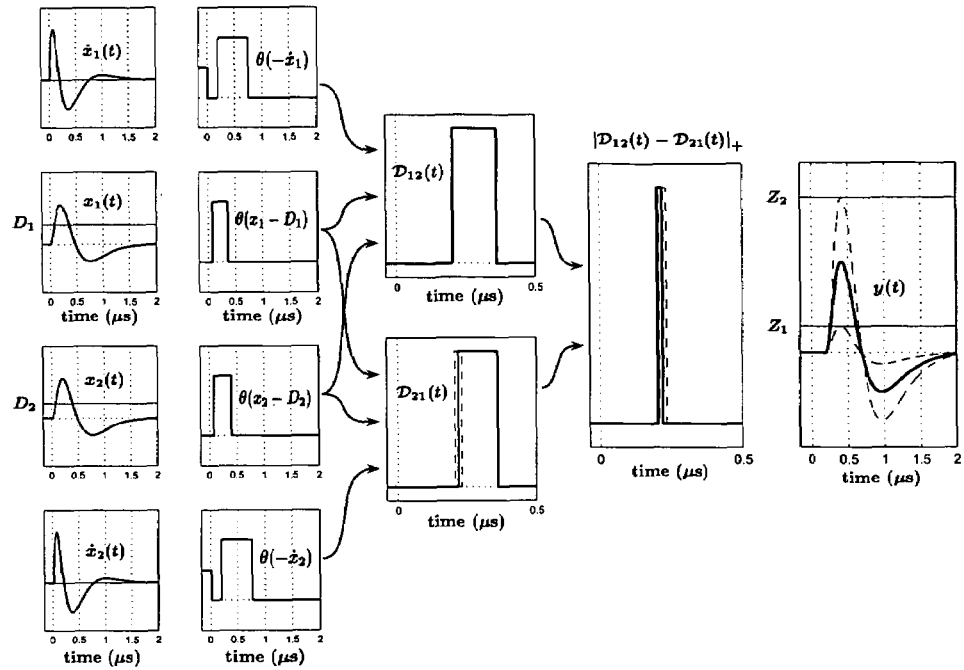
FIG. 10. Coincident counting in a time-of-flight window: (a). 'Ideal' instrument; (b) 'Realistic' instrument.
Figure 10B:
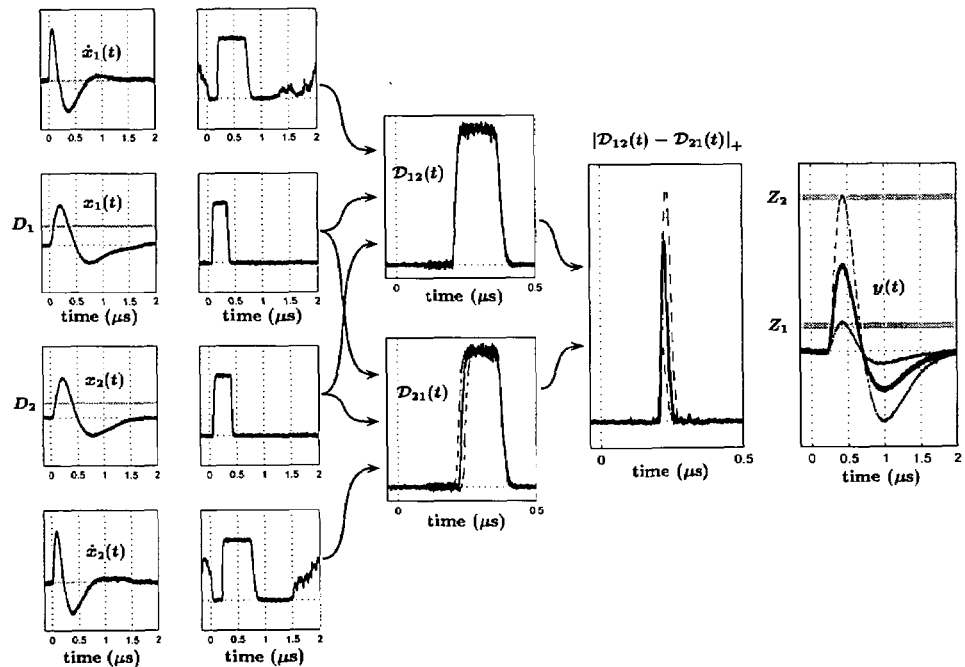

Time-of-flight (TOF) constrained measurements The time-of-flight constrained coincident rate can be expressed, for times of flight larger than $\Delta t$, as $$\mathcal{R}_c = w_T(t) * \left. \left| \frac{d}{dt} \theta[h * |\mathcal{D}_{12} - \mathcal{D}_{21}|_+ - Z_{\Delta t}] \right| \right|_+, \quad (19)$$

where h is some (unipolar or bipolar) impulse response function, $Z_{\Delta t}$ is a threshold level corresponding to the TOF equal to $\Delta t$, and $\mathcal{D}_{ij} = |\theta[x_i(t) - D_i]\theta[-\dot{x}_i(t)]\theta[x_j(t) - D_j]|_{30}$. Thus a TOF selector (see FIG. 7) will consist of a pulse shaping amplifier with an impulse response h, and a differential comparator. FIG. 10(a) illustrates coincident counting according to equation (19), and FIG. 10(b) provides an example of using a realistic model of the TOF measurements, with functional representations of the elements of the schematic corresponding to commercially-available, off-the-shelf (COTS) components. As can be seen in the figure, the performance of the system is not significantly degraded by the transition from an idealized to a more realistic model.

4 Analog Rank Filtering

In ARTEMIS, Analog Rank Filtering can be used for establishing and maintaining the analog control levels of the Threshold Domain Filtering. It ensures the adaptivity of the Threshold Domain Filtering to changes in the measurement conditions (e.g., due to nonstationarity of the signal or instrument drift), and thus the optimal separation of the features of interest from the rest of the signal. For example, the threshold level D in the domain $D = \theta[x(t) - D]\theta[\dot{x}(t)]$ can be established by means of Analog Rank Filtering to separate the stationary points of interest from those caused by noise. Note that the Analog Rank Filtering outputs the control levels indicative of the salient properties of the input signal(s), and thus can be used as a stand-alone embodiment of ARTEMIS for adaptive real-time signal conditioning, processing, analysis, quantification, comparison, and control, and for detection, quantification, and prediction of changes in signals.

Creating and maintaining baseline and analog control levels by analog rank filters Analog rank filters can be used to establish various control levels (reference thresholds) for the threshold filter. When used in ARTEMIS, rank-based filters allows us to reconcile, based on the rank filters' insensitivity to outliers, the conflicting requirements of the robustness and adaptability of the control levels of the Threshold Domain Filtering. In addition, the control levels created by Analog Rank Filters are themselves indicative of the salient properties of the input signal(s).

4.1 Adaptive Analog Rank Filters (AARFs)

Rank filter in RC window When the time averaging filter in equation (D-3) is an RC integrator (RC=$\tau$), the differential equation for the output $D_q(t)$ of a rank filter takes an especially simple form and can be written as $$\frac{dD_q}{dt} = \frac{A(2q-1) - \tilde{\mathcal{F}}_{AD}[D_q(t) - x(t)]}{2A\tau h_\tau(s) * f_{AD}[D_q(t) - x(t)]|_{s=t}}, \quad (20)$$

where $$h_\tau(t) = \theta(t)\exp\left(-\frac{t}{\tau} - \ln\tau\right). \quad (4)$$

The solution of this equation is ensured to rapidly converge to $D_q(t)$ of the chosen quantile order q regardless of the initial condition (Nikitin and Davidchack, 2003b). Note also that the continuity of the comparator is essential for the right-hand side of equation (20) to be well behaved.

*In more explicit notation, the convolution integral in the denominator of equation (20) can be written as $$h_\tau(s) * f_{\Delta D}[D_q(t) - x(s)]|_{s=t} = \frac{1}{\tau}\int_{-\infty}^t ds\, \exp\left(\frac{s-t}{\tau}\right) f_{\Delta D}[D_q(t) - x(s)].$$

The main obstacle to a straightforward analog implementation of the filter given by equation (20) is that the convolution integral in the denominator of the right-hand side needs to be re-evaluated (updated) for each new value of $D_q$. If we wish to implement an analog rank filter in a simple feedback circuit, then we should replace the right-hand side of equation (20) by an approximation which can be easily evaluated by such a circuit. Of course, one can employ a great variety of such approximations (Bleistein and Handelsman, 1986, for example), whose suitability will depend on a particular goal. A very simple approximation becomes available in the limit of sufficiently small $\tau$, since then we can replace $h_\tau(s)*f_{\Delta D}[D_q(t)-x(s)]|_{s=t}$ by $h_\tau(t)*f_{\Delta D}[D_q(t)-x(t)]$ in equation (20). As was shown by Nikitin and Davidchack (2003b), this simple approximation can still be used for an arbitrary time window w(t), if we represent w(t) as a weighted sum of many RC integrators with small $\tau$. However, this approximation fails when the threshold resolution is small (e.g., when $\Delta D < |h_\tau(t)*\dot{x}(t)|\tau$), and thus cannot be used in real-time processing of non-stationary signals.

Adaptive approximation of a feedback rank filter in an arbitrary time window A rank filter in a boxcar moving time window $B_T(t) = [\theta(t) - \theta(t-T)]/T$ is of a particular interest, since it is the most commonly used window in digital rank filters. The output $D_q$ of an analog rank filter in this window is implicitly defined as $B_T(t)*F_{\Delta D}[D_q-x(t)] = q$. To construct an approximation for this filter suitable for implementation in an analog feedback circuit, we first approximate the boxcar window $B_T(t)$ by the following moving window $w_N(t)$:[5 sense that $B_T(t)*g(t) \approx w_N(t)*g(t)$, where g(t) is a smooth function.

$$w_N(t) = \frac{1}{N}\sum_{k=0}^{N-1} h_\tau(t - 2k\tau), \quad (21)$$

where $\tau = T/(2N)$. The first moments of the weighting functions $w_N(t)$ and $B_T(t)$ are identical, and the ratio of their respective second moments is $\sqrt{1+2/N^2} \approx 1+1/N^2$. The other moments of the time window $w_N(t)$ also converge rapidly, as N increases, to the respective moments of $B_T(t)$, which justifies the approximation of equation (21).

*Since a moving time window is always a part of a convolution integral, the approximation is understood in the Now, the output of a rank filter in such a window can be approximated as discussed earlier, namely as (Nikitin and Davidchack, 2003b)[6]

$$\frac{dD_q}{dt} \approx \frac{AN(2q-1) - \sum_{k=0}^{N-1}\tilde{\mathcal{F}}_{\Delta D}[D_q(t) - x(t - 2k\tau)]}{2A\tau h_\tau(t) * \sum_{k=0}^{N-1} f_{\Delta D}[D_q(t) - x(t - 2k\tau)]}, \quad (22)$$

where $\tau = T/(2N)$. Note that the accuracy of this approximation is contingent on the requirement that $\Delta D > |h_\tau(t)*\dot{x}(t)|\tau$. This means that, if we wish to have a simple analog circuit and keep N relatively small, we must choose $\Delta D$ sufficiently large for the approximation to remain accurate. On the other hand, we would like to maintain high resolution of the acquisition system, that is, to keep $\Delta D$ small.

*An explicit expression for the convolution integral $h_\tau(t)*f_{\Delta D}[D_q(t) - x(t - 2k\tau)]$ is $$h_\tau(t) * f_{\Delta D}[D_q(t) - x(t - 2k\tau)] =$$

$$\frac{1}{\tau}\int_{-\infty}^t ds\, \exp\left(\frac{s-t}{\tau}\right) f_{\Delta D}[D_q(s) - x(s - 2k\tau)].$$

In order to reconcile these conflicting requirements, we propose to use an adaptive approximation, which reduces the resolution only when necessary. This can be achieved, for example, by using equation (D-2) and rewriting the threshold derivative of $h_\tau(t)*F_{\Delta D}[D_q - x(t)]$ as $$h_\tau(t) * f_{\Delta D}[D_q - x(t)] \approx \frac{h_\tau(t) * \{\tilde{\mathcal{F}}_{\Delta D}[D_{q+} - x(t)] - \tilde{\mathcal{F}}_{\Delta D}[D_{q-} - x(t)]\}}{4A(D_{q+} - D_{q-})}, \quad (23)$$

where $D_{q\pm}$ is the output of a rank filter of the quantile order $q \pm \delta q$, $\delta q \ll q$. In essence, the approximation of equation (23) amounts to decreasing the resolution of the acquisition system only when the amplitude distribution of the signal broadens, while otherwise retaining high resolution.

Combining equations (21-23), we arrive at the following representation of an adaptive approximation to a feedback rank filter in a boxcar time window of width T:

$$\dot{D}_q(t) = \frac{1}{2}[D_{q+}(t) + D_{q-}(t)] \quad (24)$$

$$\dot{D}_{q+}(t) = \frac{AN(2q-1+2\delta q) - \sum_{k=0}^{N-1}\tilde{\mathcal{F}}_{\Delta D}[D_{q+}(t) - x(t - 2k\tau)]}{h_\tau(t) * \delta\tilde{\mathcal{F}}_{\Delta D}(t)} \frac{\delta D_q(t)}{\tau},$$

$$\dot{D}_{q-}(t) = \frac{AN(2q-1-2\delta q) - \sum_{k=0}^{N-1}\tilde{\mathcal{F}}_{\Delta D}[D_{q-}(t) - x(t - 2k\tau)]}{h_\tau(t) * \delta\tilde{\mathcal{F}}_{\Delta D}(t)} \frac{\delta D_q(t)}{\tau}$$

where $\delta D_q(t) = D_{q+}(t) - D_{q-}(t)$ and

-continued $$\delta \tilde{\mathcal{F}}_{\Delta D}(t) = \sum_{k=0}^{N-1} \{\tilde{\mathcal{F}}_{\Delta D}[D_{q+}(t) - x(t - 2k\tau)] - \tilde{\mathcal{F}}_{\Delta D}[D_{q-}(t) - x(t - 2k\tau)]\}. \quad (25)$$

This approximation preserves its validity for high resolution comparators (small $\Delta D$), and its output converges, as N increases, to the output of the 'exact' rank filter in the boxcar time window $B_T(t)$. Unlike the currently known approaches (see, for example, Urahama and Nagao 1995; Opris 1996), the analog rank filters enabled through equation (24) are not constrained by linear convergence and allow real time implementation on an arbitrary timescale, thus enabling high speed real time rank filtering by analog means. The accuracy of this approximation is best described in terms of the error in the quantile q. That is, the output $D_q(t)$ can be viewed as bounded by the outputs of the 'exact' rank filter for different quantiles $q \pm \Delta q$. When $\Delta D$ and $\delta q$ in equation (24) are small, the error range $\Delta q$ is of order $1/N$.

Note that, even though equation (24) represents a feedback implementation of a rank filter, it is stable with respect to the quantile values q. In other words, the solution of this equation will rapidly converge to the 'true' value of $D_q(t)$ regardless of the initial condition, and the time of convergence within the resolution of the filter $\Delta D$ for any initial condition will be just a small fraction of $\tau$. This convergence property is what makes the implementation represented by equation (24) suitable for a real time operation on an arbitrary timescale.

Figure 11:
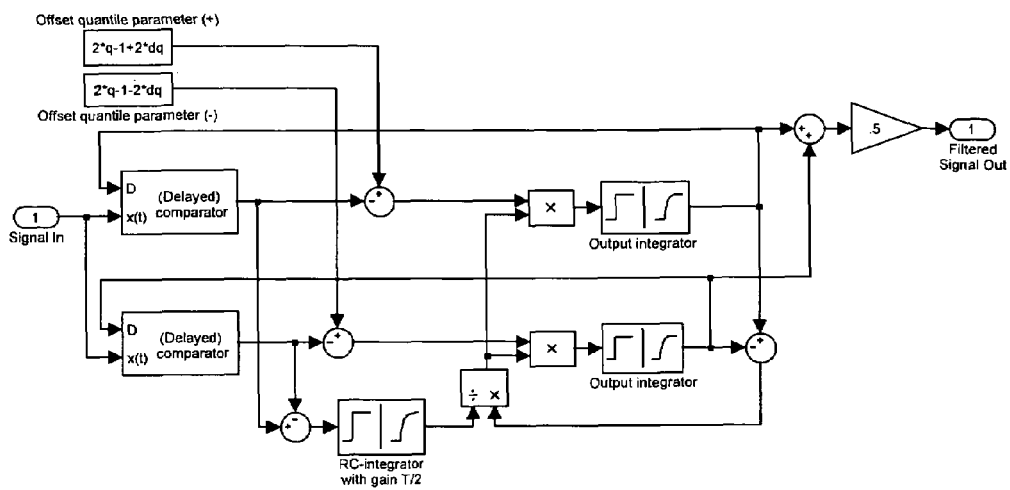
FIG. 11. Principle schematic of implementation of an adaptive real-time rank filter given by equation (24).

Implementation of AARFs in analog feedback circuits FIG. 11 illustrates implementation of an adaptive real time rank filter given by equation (24) in an analog feedback circuit. One skilled in the art will recognize that this circuit is a simplified embodiment of a more general AARF depicted in FIG. 12.

Figure 12:
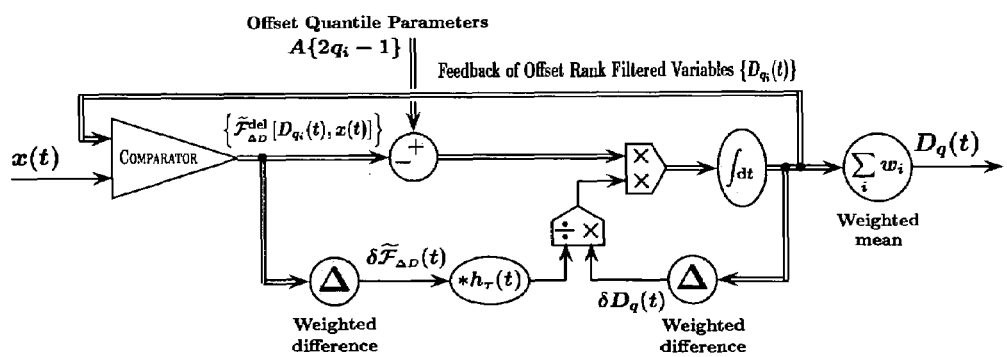
FIG. 12. Simplified diagram of an Adaptive Analog Rank Filter (AARF).

Generalized description of AARFs As shown in FIG. 12, an input variable x(t) and a plurality of feedbacks of Offset Rank Filtered Variables $\{D_{q_i}(t)\}$ are passed through a plurality of (delayed) comparators forming a plurality of outputs of the comparators $\{F_i^{del}(t)\}=\{F_{\Delta D}^{del}[D_q^i(t),x(t)]\}$. (Please note that in this and further figures a double line in a diagram indicates a plurality of signals.) Said plurality of the outputs of the comparators $\{F_i^{del}\}$ is used to form (i) a plurality $\{A(2_{q_i}-1)-F_i^{del}\}$ of differences between said outputs of the comparators and the respective Offset Quantile Parameters of said Offset Rank Filtered Variables, and (ii) a weighted difference $\delta F_{\Delta D}(t)=\Sigma_i\alpha_i F_i^{del}$, where $\Sigma_i\alpha_i=0$, of said outputs of the comparators. said weighted difference $\delta F_{\Delta D}(t)$ of the outputs of the comparators is passed through a time averaging amplifier, forming a Density Function $h_\tau(t) * \delta F_{\Delta D}(t)$. The plurality of the feedbacks of the Offset Rank Filtered Variables $\{D_{q_i}(t)\}$ is used to form a weighted difference $\delta D_q(t) = \Sigma_i\beta_i D_{q_i}(t)$, where $\Sigma_i\beta_i=0$, of said feedbacks. Each difference $A(2_{q_i}-1)-F_i^{del}$ between the outputs of the comparators and the respective Offset Quantile Parameters of the Offset Rank Filtered Variables is multiplied by a ratio of the weighted difference $\delta D_q(t)$ of the feedbacks of the Offset Rank Filtered Variables and the Density Function $h_\tau(t) * \delta F_{\Delta D}(t)$, forming a plurality of time derivatives of Offset Rank Filtered Variables $\{\mathcal{D}_{q_i}(t)\}$. Said plurality of the time derivatives $\{\mathcal{D}_{q_i}(t)\}$ is integrated to produce the plurality of the Offset Rank Filtered Variables $\{D_{q_i}(t)\}$. The plurality of the Offset Rank Filtered Variables $\{D_{q_i}(t)\}$ is then used to form an output Rank Filtered Variable $D_q(t)$ as a weighted average $\Sigma_i w_i D_{q_i}(t)$, $\Sigma_i w_i=1$, of said Offset Rank Filtered Variables.

Figure 13:
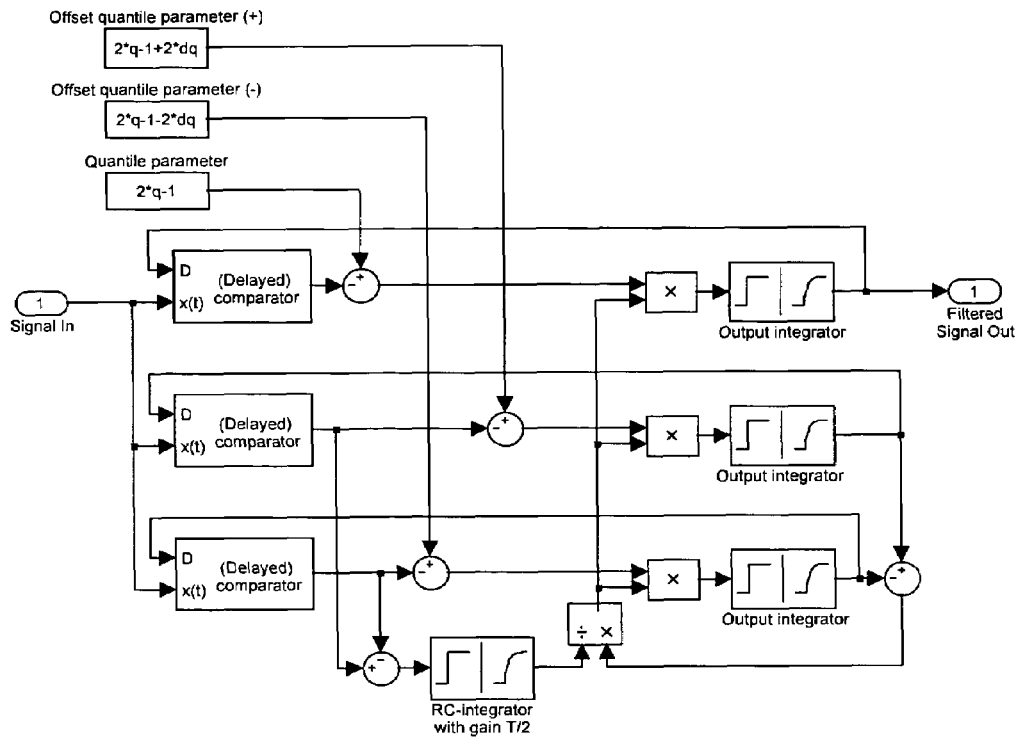
FIG. 13. Principle schematic of a 3-comparator implementation of AARF.

As an example, FIG. 13 provides a simplified diagram of a 3-comparator implementation of AARF. In this example, the offset quantile orders are $q_2=q$, $q_1=q-dq$, and $q_3=q+dq$, and the weights for weighted average and differences are: $w_2=1$, $w_1=w_3=0$, $\alpha_2=\beta_2=0$, and $\alpha_1=\beta_1=-\alpha_3=-\beta_3=-1$.

Note that both the input and output of an AARF are continuous signals. The width of the moving window and the quantile order are continuous parameters as well, and such continuity can be utilized in various analog control systems. The adaptivity of the approximation allows us to maintain a high resolution of the comparators regardless of the properties of the input signal, which enables the usage of this filter for nonstationary signals.

Also, let us point out that the equations describing this filter are also suitable for numerical computations, especially when the number of data points within the moving window is large. A simple forward Euler method is fully adequate for integrating these equations, and the numerical convolution with an RC impulse response function requires remembering only one previous value. Thus numerical algorithms based on these equations have the advantages of both high speed and low memory requirements.

Figure 14:
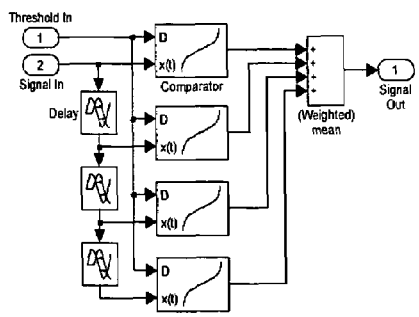
FIG. 14. Principle schematic of a delayed comparator.

Delayed comparators In our description of AARFs we have assumed that the comparators are the delayed comparators with the outputs represented by the moving averages $$\tilde{\mathcal{F}}_{\Delta D}^{del}[D_q(t), x(t)] = \sum_{k=0}^{N-1} w_k \tilde{\mathcal{F}}_{\Delta D}[D_q(t) - x(t - \Delta t_k)], \quad (26)$$

where $w_k$ are positive weights such that $\Sigma_k w_k=1$, and it can be assumed, without loss of generality, that $\Delta t_0=0$. Obviously, when $N=1$, a delayed comparator is just a simple two-level comparator. FIG. 14 illustrates a principle schematic of a delayed comparator.

Figure 15:
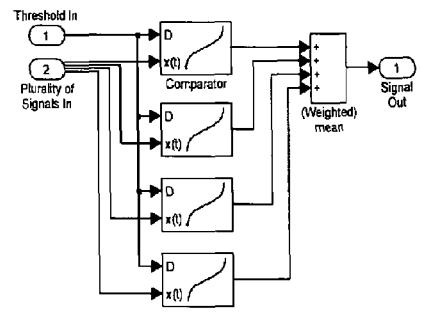
FIG. 15. Principle schematic of an averaging comparator.

Averaging comparators In the description of Adaptive Analog Rank Selectors further in this disclosure we will use another type of a comparator, which we refer to as an averaging comparator. Unlike a delayed comparator which takes a threshold level and a scalar signal as inputs, the inputs of an averaging comparator are a threshold level D and a plurality of input signals $\{x_i(t)\}$, $i=1, \ldots, N$. The output of an averaging comparator is then given by the expression $$\tilde{\mathcal{F}}_{\Delta D}^{ave}[D_q(t), \{x_i(t)\}] = \sum_{i=1}^{N} w_i \tilde{\mathcal{F}}_{\Delta D}[D_q(t) - x_i(t)], \quad (27)$$

where $w_i$ are positive weights such that $\Sigma_i w_i=1$. FIG. 15 illustrates a principle schematic of an averaging comparator.

Figure 16:
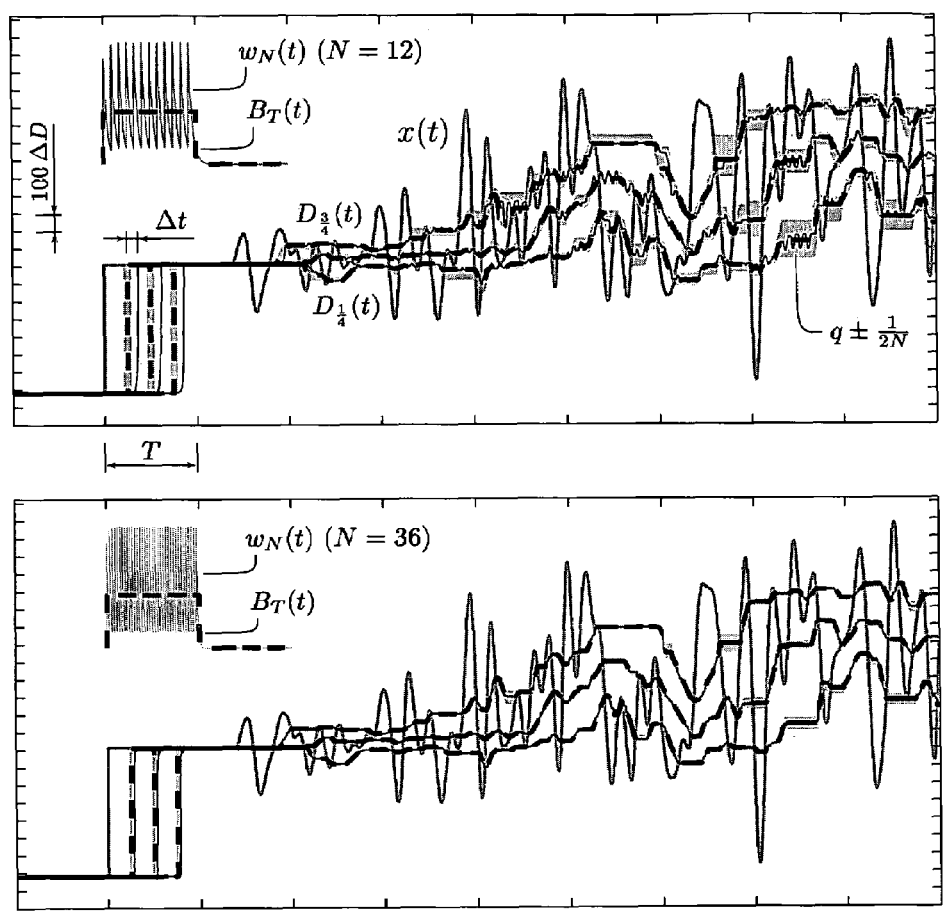
FIG. 16. Comparison of the performance of the analog rank filter given by equation (24) to that of the 'exact' quantile filter in a boxcar moving window of width T.

FIG. 16 compares the performance of the analog rank filter given by equation (24) to that of the 'exact' quantile filter in a boxcar moving window of width T. In this example, the quantile interval $\delta q$ is chosen as $\delta q=10^{-2}$ (1%). The continuous input signal x(t) (shown by the solid dark gray line) is emulated as a high resolution time series ($2 \times 10^3$ points per interval T). The 'exact' outputs of a boxcar window rank filter are shown by the dashed lines, and their deviations within the $\pm \Delta q$ intervals are shown by the gray bands. The respective outputs of the approximation given by equation (24) are shown by the solid black lines. The width parameter $\Delta D$ of the comparators, the width T of the boxcar time window, the quantile order q, and the number N of exponential kernels in the approximation are indicated in the figure.

The (instantaneous) accuracy of the approximation given by equation (24) decreases when the input signal x(t) undergoes a large (in terms of the resolution parameter $\Delta D$) monotonic change over a time interval of order $\tau$. The main effect of such a 'sudden jump' in the input signal is to delay the output $D_q(t)$ relative to the output of the respective 'exact' filter. This delay is shown as $\Delta t$ in the lower left portion of the upper panel, where the input signal is a square pulse. This timing error $\Delta t$ is inversely proportional to the number N of the kernels in the approximation. The accuracy of the approximation can also be described in terms of the amplitude error. As can be seen in FIG. 16, the residual oscillations of the outputs of the analog filter occur within the $q \pm 1/(2N)$ interval around the respective outputs of the 'exact' filter (that is, within the width of the gray bands in the figure).

Establishing internal reference signal (baseline and analog control levels) As stated earlier, a primary use of Analog Rank Filtering in ARTEMIS is establishing and maintaining the analog control levels of the Threshold Domain Filtering, which ensures the adaptivity of the Threshold Domain Filtering to changes in the measurement conditions, and thus the optimal separation of the features of interest from the rest of the signal. Such robust control levels can be established, for example, by filtering the components of the signal with a Linear Combination of Analog Order Statistics Filters operable on a given timescale.

Figure 17:
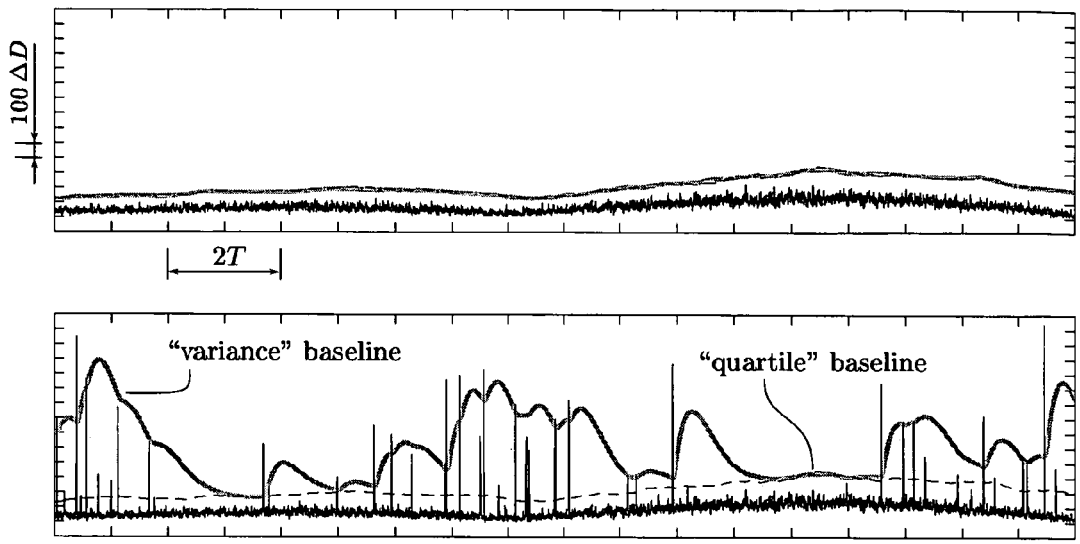
FIG. 17. Example of using an internal reference (baseline) for separating signal from noise.

Example: 'Trimean' reference. FIG. 17 provides an example of using an internal reference (baseline) for separating signal from noise, and illustrates a technique for establishing a reference baseline as a linear combination of quartile outputs (i.e., q=¼, q=½, and q=¾) of AARF In this example, the features of interest are tall pulses protruding from a noisy background. For example, one would want to count the number of such pulses, while ignoring the smaller pulses due to noise. This can be accomplished by choosing a reference baseline such that most of the pulses of interest peak above this baseline, while the accidental crossings of the baseline by noise are rare. A good choice for a baseline thus would be a moving average of the noise plus several standard deviations of the noise in the same moving window of time (a 'variance' baseline, gray lines in the figure). However, the presence of the high-amplitude pulses of the 'useful' signal will significantly disturb such a baseline. Instead, one can create a baseline by using a linear combination of the outputs of AARFs for different quantile orders (e.g., for the quartiles q=¼, q=½, and q=¾-'quartile' baseline, dashed lines in the figure). As shown in the upper panel of the figure, in the absence of the signal of interest the baselines created by both techniques are essentially equivalent. However, as shown in the lower panel of the figure, in the presence of tall pulses the 'variance' baseline is significantly disturbed and fails to separate the noise from the signal, while the 'quartile' baseline remains virtually unaffected by the addition of these pulses. In both panels, the distance between the time ticks is equal to the width of the moving time window.

Figure 18:
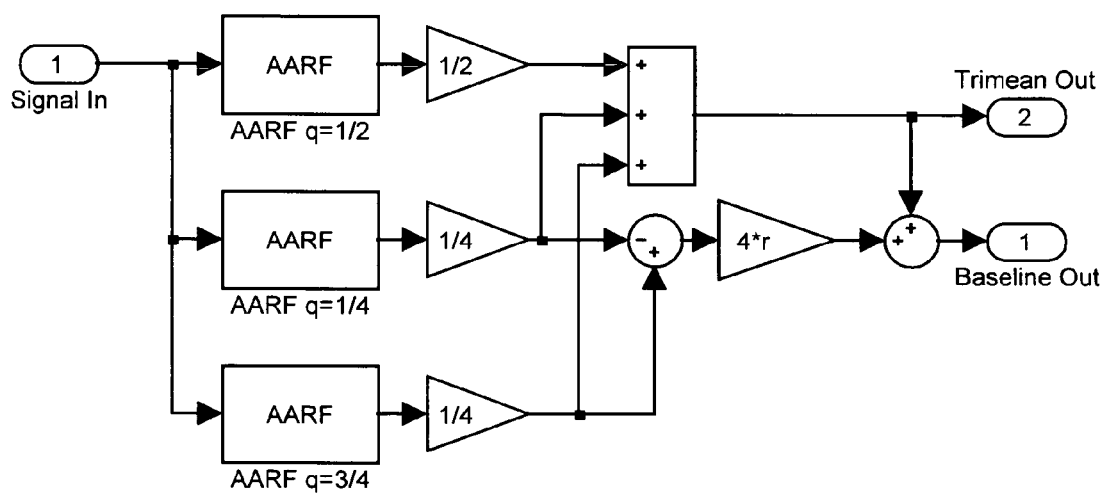
FIG. 18. Principle schematic of establishing baseline by means of quartile (trimean) filter.

FIG. 18 illustrates a principle diagram of a circuit for establishing a baseline as a linear combination of the quartile outputs (q=¼, q=½, and q=¾) of AARFs. One skilled in the art will recognize that a variety of other linear combinations of outputs of AARFs of different quantile orders can be used for establishing and maintaining the analog control levels of the Threshold Domain Filtering.

Single Point Analog Rank Tracker (SPART) The approximation of equation (24) preserves its validity for high resolution comparators (small $\Delta D$), and its output converges, as N increases, to the output of the 'exact' rank filter in the boxcar time window $B_T(t)$. However, even a single-point approximation (N=1 in equation (24), i.e., simple rather than delayed comparators in AARF) can be fully adequate for creating and maintaining the baseline and analog control levels in analog counting systems, since such a simplified implementation preserves the essential properties of the 'exact' rank filter needed for this purpose. We shall call this version of an AARF the 'Single Point Analog Rank Tracker', or SPART.

Adaptive Analog Rank Selectors (AARSs) While an AARF operates on a single scalar input signal x(t) and outputs a qth quantile $D_q(t)$ of the input signal in a moving window of time, an AARS operates on a plurality of input signals $\{x_i(t)\}$, i=1, . . . ,N, and outputs ('selects') an instantaneous qth quantile $D_q(t)$ (in general, a weighted quantile) of the plurality of the input signals. Such transition from an AARF to an AARS can be achieved by replacing the delayed comparators in an AARF by averaging comparators. For example, a 2-comparator AARS can be represented by the following equation:

$$\dot{D}_q(t) = \frac{1}{2}[D_{q+}(t) + D_{q-}(t)] \quad (28)$$

$$\dot{D}_{q+}(t) = \frac{AN(2q - 1 + 2\delta q) - \sum_{i=1}^{N} \tilde{\mathcal{F}}_{\Delta D}[D_{q+}(t) - x_i(t)]}{h_\tau(t) * \delta \tilde{\mathcal{F}}_{\Delta D}(t)} \frac{\delta D_q(t)}{\tau},$$

$$\dot{D}_{q-}(t) = \frac{AN(2q - 1 - 2\delta q) - \sum_{i=1}^{N} \tilde{\mathcal{F}}_{\Delta D}[D_{q-}(t) - x_i(t)]}{h_\tau(t) * \delta \tilde{\mathcal{F}}_{\Delta D}(t)} \frac{\delta D_q(t)}{\tau}$$

where $\delta D_q(t) = D_{q+}(t) - D_{q-}(t)$ and $$\delta \tilde{\mathcal{F}}_{\Delta D}(t) = \sum_{i=1}^{N} \{\tilde{\mathcal{F}}_{\Delta D}[D_{q+}(t) - x_i(t)] - \tilde{\mathcal{F}}_{\Delta D}[D_{q-}(t) - x_i(t)]\}. \quad (29)$$

Figure 19:
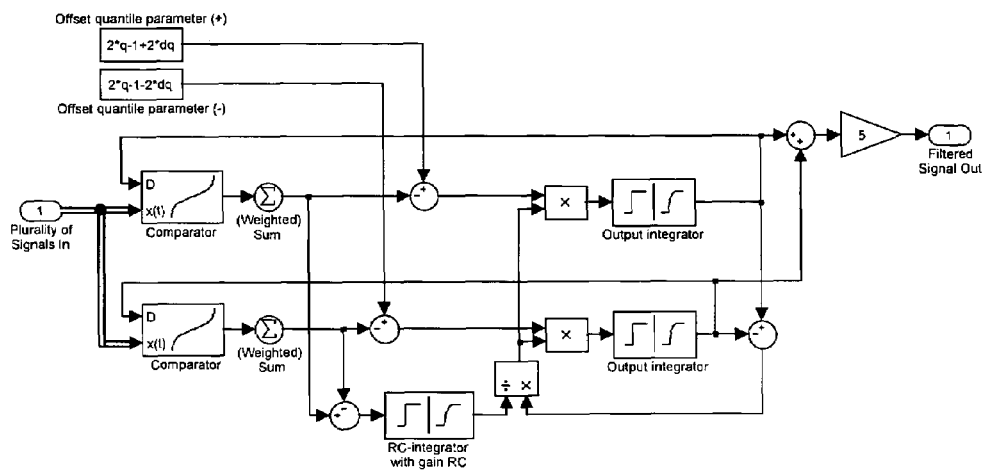
FIG. 19. Principle schematic of implementation of an adaptive real-time rank selector given by equation (28).

Note that the time of convergence (or time of rank selection) is proportional to the time constant $\tau$=RC of the RC integrator, and thus can be made sufficiently small for a true real time operation of an AARS. FIG. 19 illustrates a principle schematic of an Adaptive Analog Rank Selector given by equation (28) in an analog feedback circuit. One skilled in the art will recognize that this circuit is a simplified embodiment of a more general AARS depicted in FIG. 20.

Figure 20:
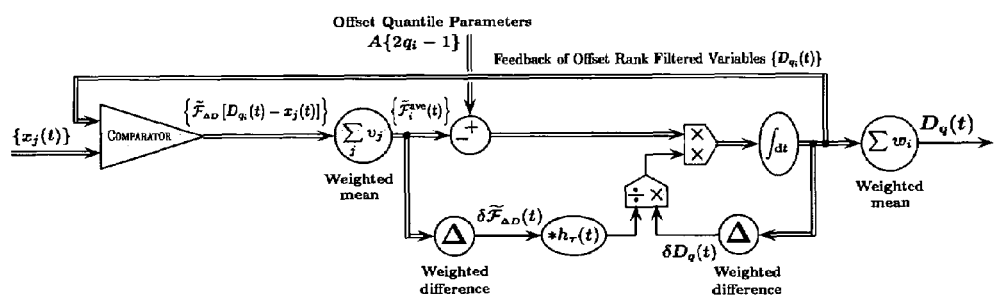
FIG. 20. Simplified diagram of an Adaptive Analog Rank Selector (AARS).

Generalized description of AARSs As shown in FIG. 20, a plurality input variables $\{x_j(t)\}$, j=1, . . . , N, and a plurality of feedbacks of Offset Rank Selected Variables $\{D_{q_i}(t)\}$ are passed through a plurality of averaging comparators forming a plurality of outputs of the comparators $\{F_i^{ave}(t)\} = \{F^{\Delta D ave}[D_{q_i}(t), x_j(t)]\} = \{\Sigma^N_{j=1} v_{jF\Delta D}[D_{q_i}(t)]\}$. Said plurality of the outputs of the comparators $\{F_i^{ave}\}$ is used to form (i) a plurality $\{A(2q_i-1)-F_i^{ave}\}$ of the differences between said outputs of the comparators and the respective Offset Quantile Parameters of said Offset Rank Selected Variables, and (ii) a weighted difference $\delta F_{\Delta D}(t) = \Sigma_i \alpha_i F_i^{ave}$, where $\Sigma_i \alpha_i = 0$, of said outputs of the comparators. Said weighted difference $\delta F_{\Delta D}(t)$ of the outputs of the comparators is passed through a time averaging amplifier, forming a Density Function $h_\tau(t) * \delta F_{\Delta D}(t)$. The plurality of the feedbacks of the Offset Rank Selected Variables $\{D_{q_i}(t)\}$ is used to form a weighted difference $\delta D_q(t)=\Sigma_i\beta_i D_{q_i}(t)$, where $\Sigma_i\beta_i=0$, of said feedbacks. Each difference $A(2q_i-1)-F_i^{ave}$ between the outputs of the comparators and the respective Offset Quantile Parameters of the Offset Rank Selected Variables is multiplied by a ratio of the weighted difference $\delta D_q(t)$ of the feedbacks of the Offset Rank Selected Variables and the Density Function $h_\tau(t)*\delta F_{AD}(t)$, forming a plurality of time derivatives of Offset Rank Selected Variables $\{\dot{D}_{q_i}(t)\}$. Said plurality of the time derivatives $\{\dot{D}_{q_i}(t)\}$ is integrated to produce the plurality of the Offset Rank Selected Variables $\{D_{q_i}(t)\}$. The plurality of the Offset Rank Selected Variables $\{D_{q_i}(t)\}$ is then used to form an output Rank Selected Variable $D_q(t)$ as a weighted average $\Sigma_i w_i D_{q_i}(t)$, $\Sigma_i w_i=1$, of of said Offset Rank Selected Variables.

Figure 21:
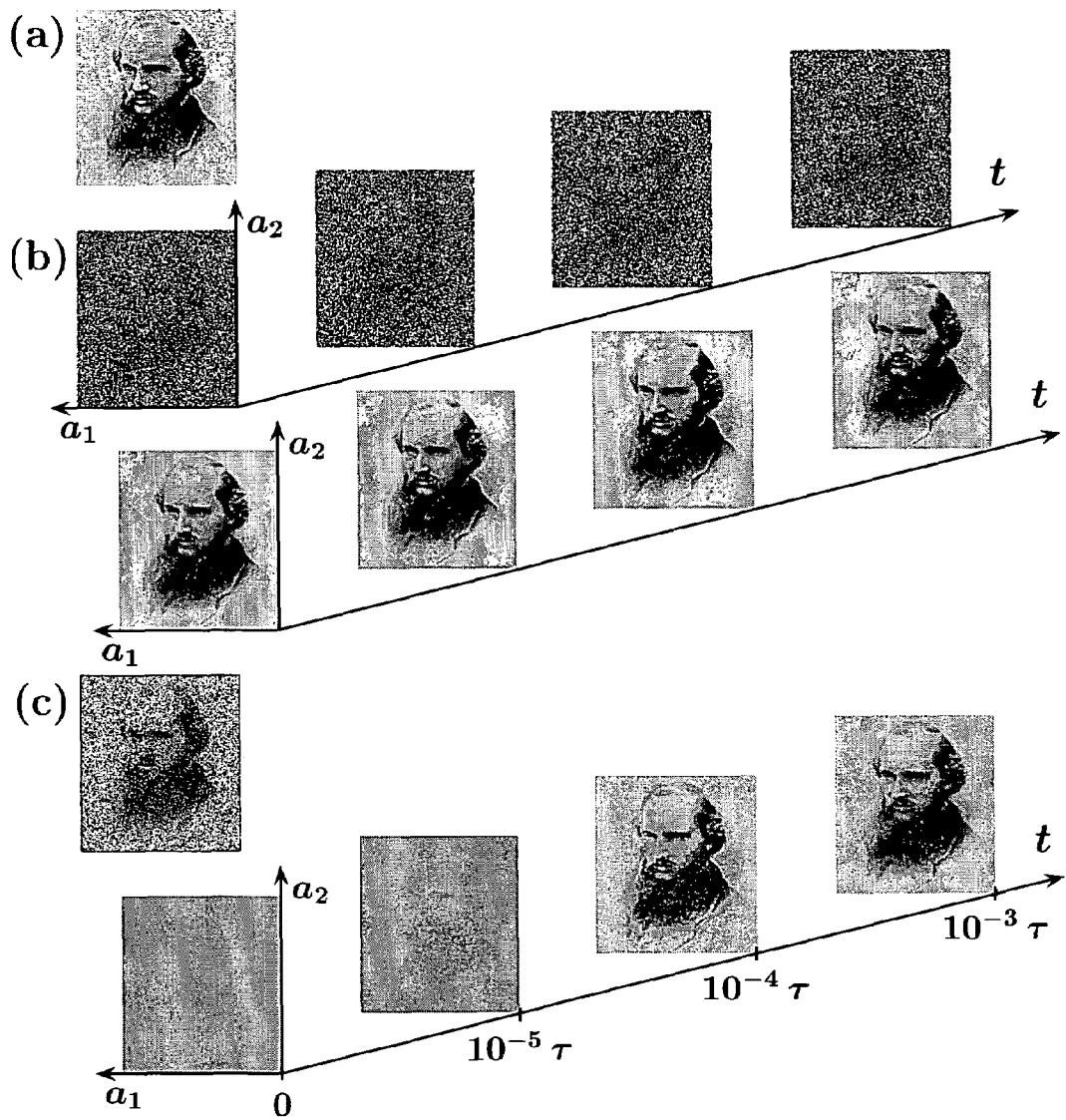
FIG. 21. Removing static and dynamic impulse noise from a monochrome image by AARSs.

Adaptive Analog Rank Selectors are well suited for analysis and conditioning of spatially-extended objects such as multidimensional images. For example, a plurality of input signals can be the plurality of the signals from a vicinity around the spatial point of interest, and the weights $\{v_j\}$ can correspond to the weights of a spatial averaging kernel. This enables us to design highly efficient real-time analog rank filters for removing dynamic as well as static impulse noise from an image, as illustrated in FIG. 21 for a two-dimensional monochrome image. In this example, a median filter ($q=\frac{1}{2}$) according to equation (28) is used.[7] Panel (a) shows the original (uncorrupted) image. Panel (b) shows the snapshots, at different times, of the noisy image and the respective outputs of the filter. In this example, approximately ⅘ of the pixels of the original image are affected by a bipolar non-Gaussian random noise at any given time. Panel (c) provides an example of removing the static noise (⅓ of the pixels of the original image are affected). This example also illustrates the fact that the characteristic time of convergence of the filter based on equation (28) is only a small fraction of the time constant $\tau=RC$ of the RC integrator, which makes this circuit suitable for a truly real-time operation. This fast convergence is a consequence of the fact that the speed of convergence is inversely proportional to the density function $h_{96}(t)*\delta F_{AD}(t)$.

*In general, the quantile order of the filter should be chosen as $q=\Phi_n(0)$, where $\Phi_n$ is the amplitude distribution of the noise (either measured or known a priori). In the example of this section, $\Phi_n(0)=\frac{1}{2}$.

4.2 Explicit Analog Rank Locators (EARLs)

Explicit expression for an analog quantile filter Note that a differential equation is not the only possible embodiment of an analog quantile filter. Other means of locating the level lines of the threshold distribution function can be developed based on the geometric interpretation discussed in §D-2. For example, one can start by using the sifting property of the Dirac $\delta$-function to write $D_q(t)$ as $$D_q(t)=\int_{-\infty}^\infty dD\, D\delta[D-D_q(t)] \quad (30)$$

for all t. Then, recalling that $D_q(t)$ is a root of the function $\Phi(D,t)-q$ and that, by construction, there is only one such root for any given time t, we can replace the $\delta$-function of thresholds with that of the distribution function values as follows:

$$D_q(t)=\int_{-\infty}^\infty dD\, D\phi(D,t)\delta[\Phi(D,t)-q]. \quad (31)$$

Here we have used the following property of the Dirac $\delta$-function (see Davydov, 1988, p. 610, eq. (A 15), for example):

$$\delta[a-f(x)]=\sum_i\frac{\delta(x-x_i)}{|f'(x_i)|}, \quad (32)$$

where $|f'(x_i)|$ is the absolute value of the derivative of $f(x)$ at $x_i$, and the sum goes over all $x_i$ such that $f(x_i)=a$. We have also used the fact that $\phi(D,t)\leq 0$.

The final step in deriving a practically useful realization of the quantile filter is to replace the $\delta$-function of the ideal measurement process with a finite-width pulse function $g_{\Delta q}$ of the real measurement process, namely $$D_q(t)=\int_{-\infty}^\infty dD\, D\phi(D,t)g_{\Delta q}[\Phi(D,t)-q], \quad (33)$$

where $\Delta q$ is the characteristic width of the pulse. That is, we replace the $\delta$-function with a continuous function of finite width and height. This replacement is justified by the observation made earlier: it is impossible to construct a physical device with an impulse response expressed by the $\delta$-function, and thus an adequate description of any real measurement must use the actual response function of the acquisition system instead of the d-function approximation. We shall call an analog rank filter given by equation (33) the Explicit Analog Rank Locator (EARL).

Analog L filters and $\alpha$-trimmed mean filters It is worth pointing out the generalization of analog quantile filters which follows from equation (31). In the context of digital filters, this generalization corresponds to the L filters described by Bovik et al. (1983).

Indeed, we can write a linear combination of the outputs of various quantile filters as $$\begin{aligned}D_L(t)&=\int_0^1 dq W_L(q)D_q(t) \\ &=\int_0^1 dq W_L(q)\int_{-\infty}^\infty dD\, D\phi(D,t)\delta[\Phi(D,t)-q] \\ &=\int_{-\infty}^\infty dD\, D\phi(D,t)W_L[\Phi(D,t)],\end{aligned} \quad (34)$$

where $W_L$ is some (normalized) weighting function. Note that the difference between equations (34) and (33) is in replacing the narrow pulse function $g_{\Delta q}$ in (33) by an arbitrary weighting function $W_L$.

A particular choice of $W_L$ in (34) as the rectangular (boxcar) probe of width $1-2\alpha$, centered at ½, will correspond to the digital $\alpha$-trimmed mean filters described by Bendat (1998):

$$\overline{D}_\alpha(t)=\int_{-\infty}^\infty dD\, D\phi(D,t)\, b_\alpha[\Phi(D,t)],\; 0\leq\alpha<\frac{1}{2}, \quad (35)$$

where $$b_\alpha(x)=\frac{1}{1-2\alpha}[\theta(x-\alpha)-\theta(x-1+\alpha)].$$

$\theta(x-1+\alpha)]$. When $\alpha=0$, equation (35) describes the running mean filter, $\overline{D}_{\alpha=0}(t)=\overline{x}(t)$, and in the limit $\alpha\to\frac{1}{2}$ it describes the median filter, $\lim_{\alpha\to 1/2}\overline{D}_\alpha(t)=D_m(t)$.

Dealing with improper integration: Adaptive EARL The main practical shortcoming of the filter given by equation (33) is the improper integral with respect to threshold. This difficulty, however, can be overcome by a variety of ways.

For example, we can use the fact that rank is not affected by a monotonic transformation. That is, if $D_q$ is the qth quantile of the distribution $w_\tau(t)*\theta[D-x(t)]$ (that is, $w_\tau(t)*\theta[D_q-x(t)]=q$), then $F(D_q)$ is the qth quantile of the distribution $w_\tau(t)*\theta\{F(D)-F[x(t)]\}$:

$$w_\tau(t)*\theta\{F(D_q)-F[x(t)]\}=q, \qquad (36)$$

where $F(\xi)$ is a monotonically increasing function of $\xi$.

Now let us choose $\bar{\xi}=F(\xi)$ as the response of a real comparator, $F(\xi)=\mathcal{F}_{\mu_2}(\xi-\mu_1)$, where $\mu_1$ is indicative of the mean value of x(t) in a moving window $w_T$ of the width T much greater than $\tau$, and the width parameter $\mu_2$ is indicative of the signal's deviation around $\mu_1$ (on a similar time interval). For example, $$\begin{cases} \bar{\xi} = \mathcal{F}_{\mu_2}(\xi - \mu_1) \\ \mu_1(t) = w_T(t) * x(t) \\ \mu_2(t) = \sqrt{2[w_T(t) * x^2(t) - \mu_1^2(t)]} \end{cases} \qquad (37)$$

Then an equation for the adaptive explicit analog rank locator can be rewritten as $$D_q(t) = \mu_1(t) + \mathcal{F}_{\mu_2}^{-1}\left\{\int_0^1 d\chi \chi \tilde{\phi}(\chi, t) g_{\Delta q}[\Phi(\chi, t) - q]\right\}, \qquad (38)$$

where $$\tilde{\phi}(\chi, t) = \frac{w_\tau(t) * \{K(t) f_{\Delta D}[\chi - \bar{x}(t)]\}}{w_\tau(t) * K(t)}, \qquad (39)$$

and $$\Phi(\chi, t) = \frac{w_\tau(t) * \{K(t) \mathcal{F}_{\Delta D}[\chi - \bar{x}(t)]\}}{w_\tau(t) * K(t)}. \qquad (40)$$

Note that the improper integral of equation (33) has become an integral over the finite interval [0,1], where the variable of integration is a dimensionless variable $\chi$.

Figure 22:
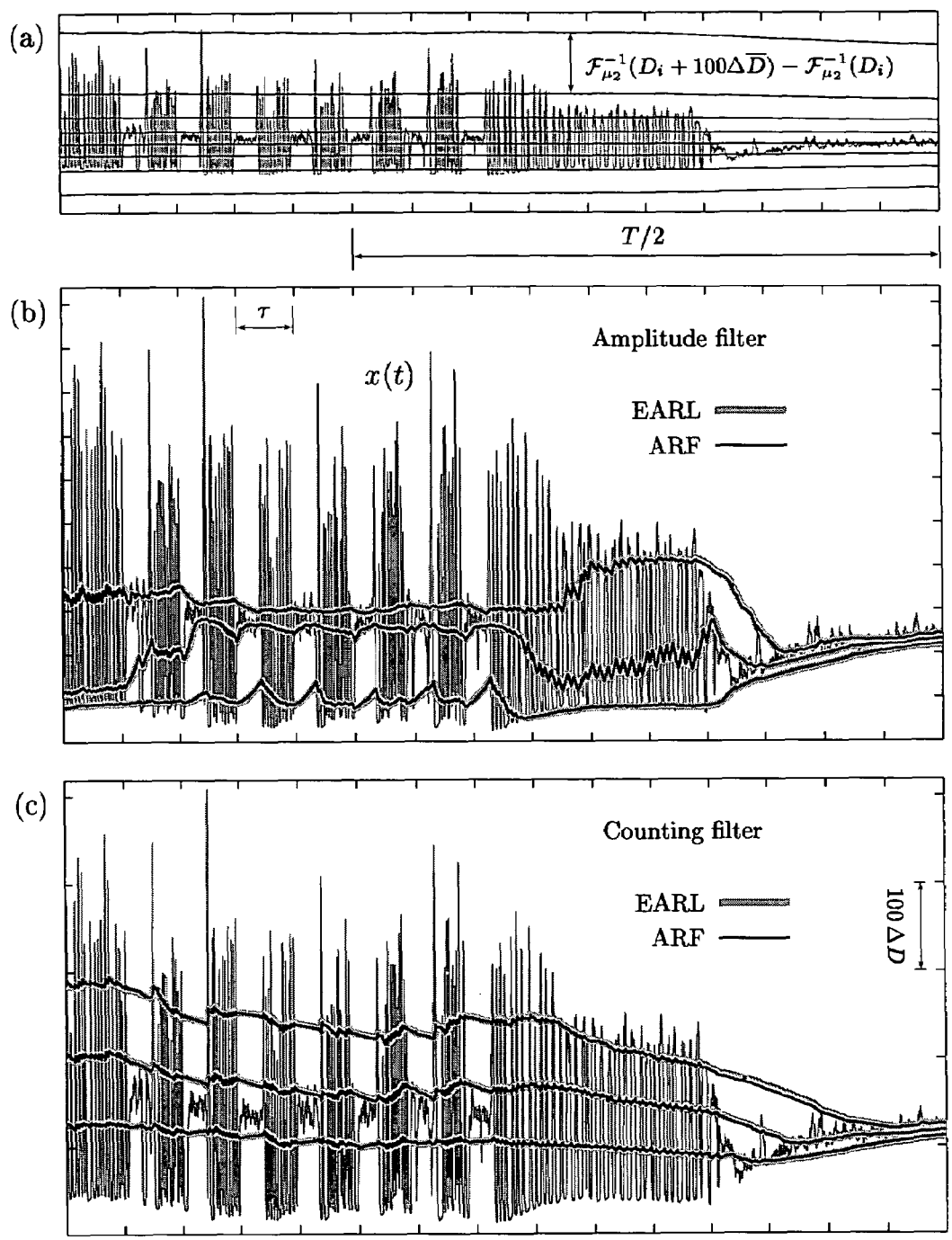
FIG. 22. Comparison of quartile outputs ($q=\frac{1}{4}$, $\frac{1}{2}$, and $\frac{3}{4}$) of ARF and EARL for amplitudes and counts.

FIG. 22 illustrates the performance of adaptive EARLs operating as amplitude (panel b)) and counting (panel (c)) rank filters in comparison with the 'exact' outputs of the respective analog rank filters given by equation (D-6).

Discrete-Threshold Approximation to Adaptive EARL Given a monotonic array of threshold values between zero and unity, the integral in equation (38) can be evaluated in finite differences leading to a discrete-threshold approximation to adaptive EARL as follows:

$$D_q(t) = \mu_1(t) + F_{\mu_2}^{-1}(\overline{D}_q), \qquad (41)$$

where $\overline{D}_q$ is the root of $\Phi(D,t)=q$. For example, $\overline{D}_q=\frac{1}{2}(D_{j_1}$ is a monotonic array of threshold values, $D_i<D_{i+1}$, and $j_1$ and $j_2$ are such that $\Phi(D_{j_1},t) \leq q < \Phi(D_{j_1+1},t)$ and $\Phi(D_{j_2},t) < q \leq \Phi(D_{j_2+1},t)$. Note that a binary search, as well as more effective methods, can be used for the root finding, and thus the discrete-threshold approximation to adaptive EARL can have significant advantages over the state-of-art numerical algorithms for rank filtering, especially when operating on large time scales.

Discrete-Threshold Approximation to AARF It is worth pointing out that the invariance of rank to a monotonic transformation allows us to define the following discrete-threshold approximation to an adaptive analog rank filter:

$$\dot{\overline{D}}_q(t) = \frac{K(t)\{q - \mathcal{F}_{\Delta D}[\overline{D}_q(t) - \bar{x}(t)]\}}{\tau h_\tau(t) * \{K(t) f_{\Delta D}[D_k(t) - \bar{x}(t)]\}}, \qquad (42)$$

where $D_k(t)=\delta Dk(t)=\delta D\, \text{nint}(\overline{D}_q(t)/\delta D)$,[8] and $\delta D<<\Delta \overline{D}$.

[8]The nearest integer function nint(x) is defined as the integer part of $$x + \frac{1}{2},\; \text{nint}(x) = \left\lfloor x + \frac{1}{2} \right\rfloor.$$

4.3 Example: Bimodal Analog Sensor Interface System (BASIS)

BASIS constitutes an analog signal processing module, initially intended to be coupled with a photon counting sensor such as a photomultiplier tube (PMT). The resulting integrated photodetection unit allows fast and sensitive measurements in a wide range of light intensities, with adaptive automatic transition from counting individual photons to the continuous (current) mode of operation. When a BASIS circuit is used as an external signal processing unit of a photosensor, its output $R_{out}(t)$ is a continuous signal for both photon counting and current modes, with a magnitude proportional to the rate of incident photons. This signal can be, for example, used directly in analog or digital measuring and/or control systems, differentiated (thus producing continuous time derivative of the incident photon rate), or digitally sampled for subsequent transmission and/or storage. Thus, BASIS converts the raw output of a photosensor to a form suitable for use in continuous action light and radiation measurements.

The functionality of the BASIS is enabled through the integration of three main components: (1) Analog Counting Systems (ACS), (2) Adaptive Analog Rank Filters (AARF), and (3) Saturation Rate Monitors (SRM), as described further. The BASIS system provides several significant advantages with respect to the current state-of-art signal processing of photosignals. Probably the most important advantage is that, by seamlessly merging the counting and current mode regimes of a photosensor, the output of the BASIS system has a contiguous dynamic range extended by 20-30 dB. This technical enhancement translates into important commercial advantages. For example, the extension of the maximum rate of the photon counting mode of a PMT by 20 dB can be used for a tenfold increase in sensitivity or speed of detection. Since sensitivity and speed of light detecting units is often the bottleneck of many instruments, this increase will result in upgrading the class of equipment at a fraction of the normal cost of such an upgrade.

In addition, the analog implementation of the current mode regime reduces the overall power consumption of the detector. These capabilities will benefit applications dealing with light intensities significantly changing in time, and where autonomous low-power operation is a must. One particular example of such an application is a high sensitivity handheld radiation detection system that could be powered with a small battery. Such a compact detector could be used by United States customs agents to search for nuclear materials entering the country.

Figure 23:
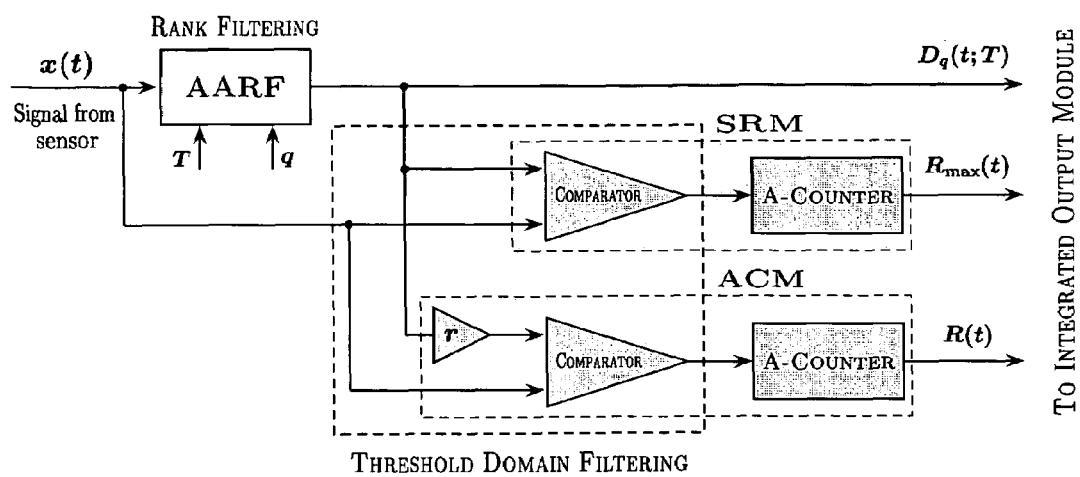
FIG. 23. Simplified principle schematic of a Bimodal Analog Sensor Interface System (BASIS).

Principal components (modules) of BASIS As shown in FIG. 23, the principal components (modules) of the BASIS can be identified as (I) Rank Filtering (or Baseline) Module, (II) Analog Counting Module (ACM), (III) the Saturated Rate Monitor (SRM), and (IV) Integrated Output Module. A brief description of these modules is as follows.

Rank Filtering (or Baseline) Module As shown in FIG. 23, the Baseline Module outputs the rank-filtered signal $D_q(t;T)$, which is the qth quantile of the signal x(t) in a moving time window of characteristic width T. The rank filtering is accomplished by means of an Adaptive Analog Rank filter (AARF) (see §4.1), or its single-point version referred to as a Single Point Analog Rank Tracker (SPART) (ibidem). AARFs, due to their insensitivity to outliers, are essential for stable operation of BASIS, and are used to create, maintain, and modify its analog control levels (the control levels of the comparators in the Threshold Domain Filter). For example, a baseline created by an AARF operating as a median filter (i.e., $q=\frac{1}{2}$) will not significantly change its value unless the photoelectron rate exceeds about half of the saturation rate $R_{max}$. On the other hand, this baseline will track the changes in the noise level, providing an effective separation between noise and the photosignal.

When the photoelectron rate exceeds the saturation rate $R_{max}$, the output of the AARF itself will well represent the central tendency of the photosignal, and thus will be proportional to the incident photon rate. In the 'transitional' region (around $R_{max}$), the output of the BASIS can be constructed as a weighted sum of the outputs of AARF and ACM. Thus the total output of BASIS can be constructed as a combination of the outputs of AARF, ACM, and SRM, and calibrated to be proportional to the incident photon rate.

Analog Counting Module (ACM) This module produces a continuous output, R(t), equal to the rate of upward zero crossings of the difference, $x(t)-rD_q(t;T)$, in the time window, w(t), given by $$R(t) = w(t) * \mathcal{R}(t) = w * \left| \frac{d}{dt} \theta(x - rD_q) \right|_+, \quad (43)$$

where R(t) denotes the instantaneous crossing rate (Nikitin et al., 2003). The value of the parameter r generally depends on the distribution of the photosensor's noise in relation to the single photoelectron distribution of the photosensor, and can normally be found either theoretically or empirically based on the required specifications. This parameter affects the ratio of the false positive (noise) and the false negative counts (missed photoelectrons) and allows us to achieve a desired compromise between robustness and selectivity. In the subsequent simulated example (see FIG. 25), the quantile parameter $q=\frac{1}{2}$ (AARF operating as a median filter), and r=6. An attractive choice for the time averaging filter w(t) is a sequence of 3 RC-integrators with identical time constants $\tau=T/6$, which will provide us with rate measurements corresponding to the time averaging with a rectangular moving window of width T (Nikitin et al., 2003).

The main advantage of the analog counting represented by equation (43) is a complete absence of dead time effects (see Nikitin et al. 2003). In addition, the baseline created by an AARF will not be significantly affected by the photoelectron rates below approximately $(1-q)R_{max}$ (half of the photosensor saturation rate for a median filter). Thus the maximum measured rate is limited only by the single electron response of a photosensor. This is at least two orders of magnitude higher than the current state of the art photon counting systems. For example, in the simulation presented in FIG. 25, the FWHM of the single electron response is about 1 ns, and the saturation rate of photon counting is about $3 \times 10^8 s^{-1}$. Since the signal-to-noise ratio is proportional to the square root of the rate, the 20 dB increase in the photon counting rate translates into a tenfold increase either in the sensitivity or the speed of detection.

Saturation Rate Monitor (SRM) The SRM produces a continuous output $R_{max}(t)$ equal to the rate of upward zero crossings of the difference $x(t)-D_{1/2}(t;T)$ in the time window w(t), $$R_{max}(t) = w * \left| \frac{d}{dt} \theta(x - D_q) \right|_+. \quad (44)$$

As was theoretically derived by Nikitin et al. (1998), $R_{max}$ is approximately equal to the maximum rate of upward (or downward) crossings of any constant threshold by the photosensor signal x(t). When the photoelectron rate $\lambda_{PhE}$ of a photosensor is much smaller than $R_{max}$, the pileup effects are small, and the photosensor is in a photon counting mode. When $\lambda_{PhE} >> R_{max}$, the photosensor is in a current mode.

Figure 25:
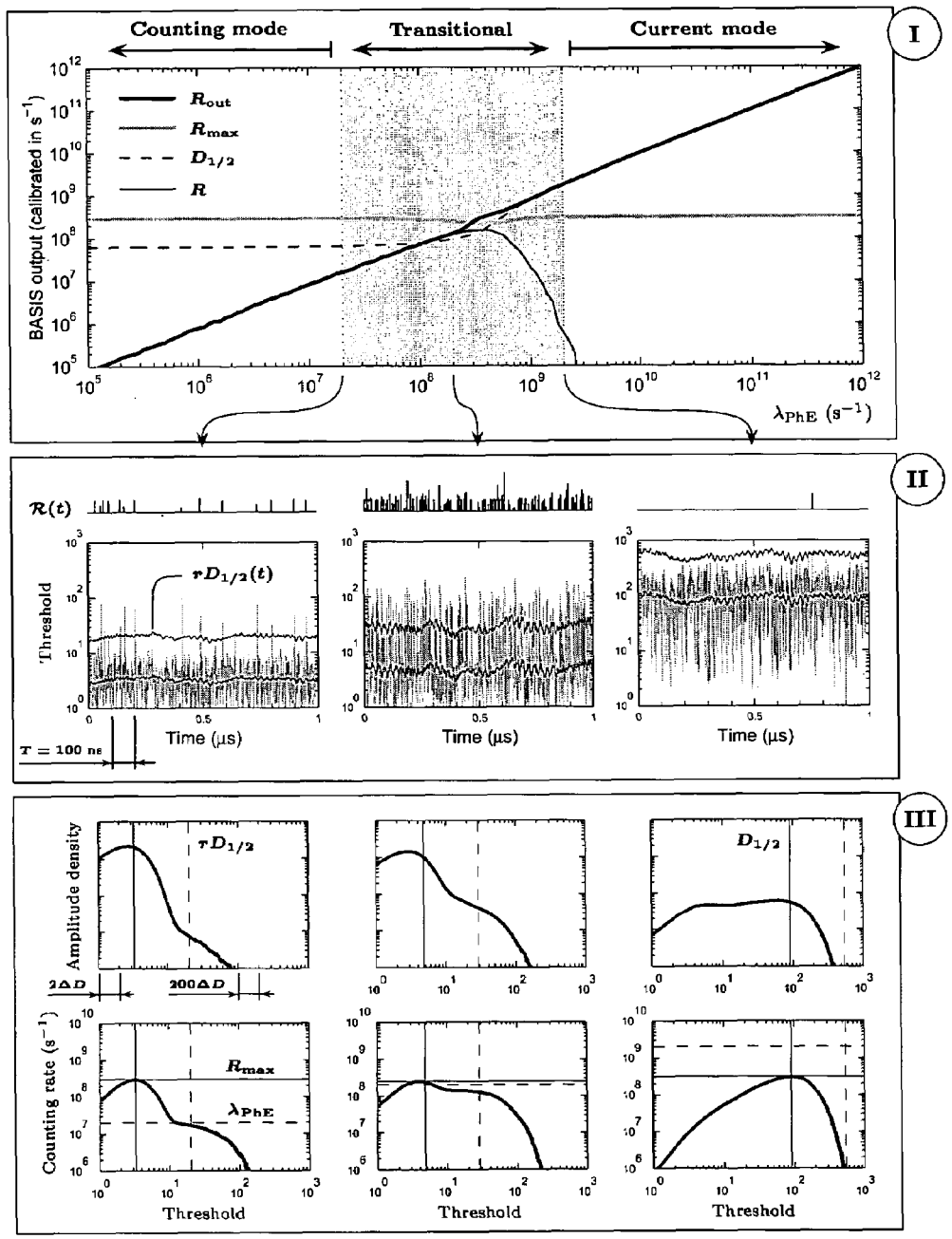
FIG. 25. Simulated example of the performance of BASIS used with a PMT.

Thus monitoring $R_{max}$ allows us to automatically handle the transition between the two modes. The horizontal gray line in panel I of FIG. 25 shows the measured $R_{max}$ as a function of the photoelectron rate $\lambda_{PhE}$. The measured saturation rate is also shown by the horizontal thin solid lines in the lower half of panel III of FIG. 25.

Figure 24:
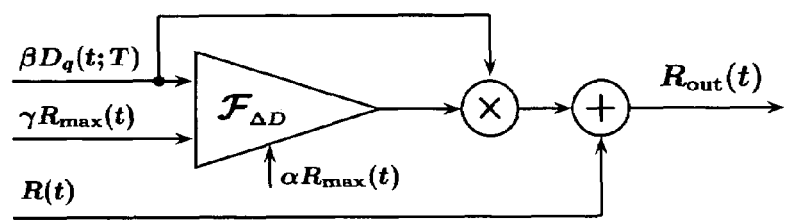
FIG. 24. Simplified principle schematic of an Integrated Output Module of BASIS.

Integrated Output Module As shown in FIG. 24, the output module of BASIS combines the outputs of the ACM, SRM, and AARF into a single continuous output $R_{out}(t)$. The magnitude of $R_{out}(t)$, for both the photon counting and the current modes, is proportional to the rate of incident photons. This signal can be, for example, used directly in analog or digital measuring and/or control systems, differentiated (thus producing continuous time derivative of the incident photon rate), or digitally sampled for the subsequent transmission and/or storage. For the simulated example shown in FIG. 25, $R_{out}(t)$ was chosen as the following combination of $D_q(t;T)$, R(t), and $R_{max}(t)$:

$$R_{out}(t) = R(t) + \beta D_q(t;T) F_{\Delta d}[\beta D_q(t;T) - \gamma R_{max}(t)],$$

where $\beta$ is a calibration constant, $\Delta D = \alpha R_{max}$, a being a small number (of order $10^{-1}$), and $\gamma \sim \frac{1}{2}$ is a quantile constant. The Integrated Output Module thus includes the 'transitional' region between the photon counting and the current modes (shaded in gray in FIG. 25), currently unavailable, into a normal operational range of a photosensor, extending by ~20 dB the photosensor's contiguous dynamic range.

Simulated examples of light measurements conducted by PMT with BASIS unit FIG. 25 provides a simulated example of the performance of BASIS used with a PMT. In the simulation, a fast PMT was used (the FWHM of the single electron response is about 1 ns), and the noise rate was chosen to be high (order of magnitude higher than the PMT saturation rate). Panel I of the figure shows the output of BASIS ($R_{out}$, thick solid black line) as a function of the photoelectron rate $\lambda_{PhE}$, along with the outputs of the Saturation Rate Monitor ($R_{max}$, solid gray line), Rank Filtering Module ($D_{1/2}$, dashed line), and Analog Counting Module (R, thin solid black line). Panel II shows (by gray lines) 1 μs snapshots of the PMT signal for the photoelectron rates much smaller (left), approximately equal (middle), and much higher (right) than the saturation rate of the PMT. This panel also shows (by the black lines) the respective outputs of the Rank Filtering Module $D_{1/2}(t)$, and the baseline levels $rD_{1/2}(t)$ used in the Analog Counting Module (r=6 in the simulation). The instantaneous crossing rates R(t) are also shown (top), and the time constant T of AARF is indicated in the lower left corner of the panel. Panel III illustrates the relation between the noise and photosignal used in the simulation by depicting the accumulated amplitude and counting distributions of the PMT signal. These distributions are shown for three chosen photoelectron rates $\lambda_{PhE}$, in their relation to the outputs of the Rank Filtering Module ($D_{1/2}$) and the Saturation Rate Monitor ($R_{max}$). The resolution $\Delta D$ of the acquisition system used for measuring the distributions is indicated in the panel.

Figure 26:
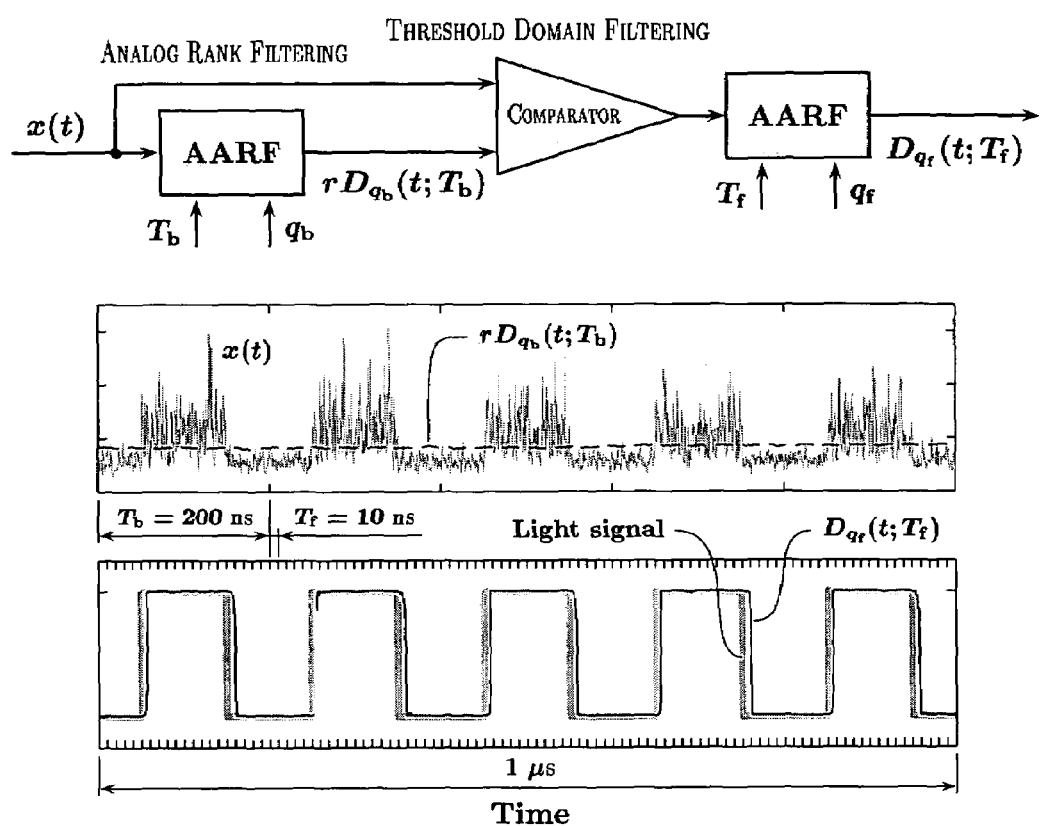
FIG. 26. Modification of BASIS used for detection of onsets/offsets of light pulses.

FIG. 26 provides a simulated example of a modification of BASIS designed for detection of fast changes in a light level. The light signal corresponding to this model can be, for example, an intensity modulated light signal passing through a fiber, or fluorescence of dye excited by an action potential wave propagating through a biological tissue. The gray line in the lower panel of the figure shows the time-varying light signal (square pulses). The higher light level corresponds to the photoelectron rate of about $2\times10^9$ photoelectrons per second. The width (FWHM) of the single electron response of the photosensor is about 1 ns, and the resulting photosensor electrical signal x(t) is shown by the gray line in the middle panel.

As can be seen in the figure, the low signal-to-noise ratio makes fast and accurate deduction of the underlying light signal difficult. The circuit shown at the top of FIG. 26, however, allows reliable timing of the onsets and offsets of the light pulses with better than 10 ns accuracy. The output of the circuit $D_{q_f}(t;T_f)$ is shown by the black line in the lower panel of the figure. In the example, the quantile parameters of the rank filters are $q_b=\frac{1}{4}$ and $q_f=\frac{3}{4}$, and the baseline factor is r=1.5. The parameter r allows us to adjust the circuit for optimal performance based on the difference between the low and high light levels.

5 Generation of Monoenergetic Poissonian Pulse Trains

As another illustration of the current invention, consider a technique and a circuit for generation of monoenergetic Poissonian pulse trains with adjustable rate and amplitude. Generators of such pulse trains can be used, for example, in testbench development and hardware prototyping of instrumentation for nuclear radiation measurements.

Figure 27:
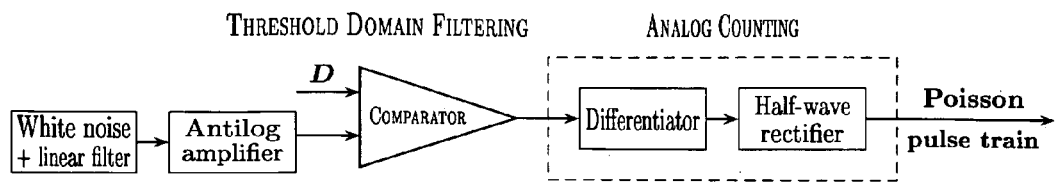
FIG. 27. Principle schematic of a monoenergetic Poisson pulse generator.

Idealized model of a Poisson pulse train generator An idealized process producing a monoenergetic Poissonian pulse train can be implemented as schematically shown in FIG. 27. Consider a stationary random pulse train $\Sigma_i x_i \delta(t-t_i)$, where $x_i$ are the amplitudes of the pulses with the arrival times $t_i$. This pulse train is filtered by a linear time filter with a continuous impulse response $w_{\Delta\tau}(t)$, where $\Delta\tau$ is the characteristic response time of the filter. An example of such a response would be the bipolar pulse $w_{\Delta\tau}(t)=[t/\Delta\tau^2-t^2/(2\Delta\tau^3)]e^{-t/\Delta\tau}\theta(t)$, where $\theta$ is the Heaviside unit step function. The output x(t) of the linear time filter can be written as $$x(t) = \sum_i x_i w_{\Delta\tau}(t-t_i), \quad (46)$$

and is a continuous signal. The instantaneous rate of upward crossings Nikitin et al. (2003) of a threshold D by this signal can be written as $$\mathcal{R}(D,t) = \left|\frac{d}{dt}\theta[x(t)-D]\right|_+ = \sum_j \delta(t-t_j), \quad (47)$$

where $t_j$ are the instances of the crossings (that is, $x(t_j)=D$ and $\dot{x}(t_j)>0$). As was discussed in Nikitin (1998), the pulse train given by equation (47) is an approximately Poissonian train affected by a non-extended dead time of order $R_{max}^{-1}$. Thus, when the average rate $R(D)=<\mathcal{R}(D,t)>_T$ is much smaller than the saturation rate $R_{max}$, $\mathcal{R}(D,t)$ will provide a good approximation for a monoenergetic Poissonian pulse train of the average rate R(D).

When either $M_j=0$ or $W_{10}=0$, then, as was shown in Nikitin et al. (1998), the average rate of the upward crossings of a threshold D by the signal x(t) can be expressed as $$R(D) = R_{max}\exp\left[-\frac{1}{2}\left(\frac{D}{\sigma}\right)^2\right], \quad (48)$$

and thus the rate of the generated pulse train can be adjusted by an appropriate choice of the threshold value D.

Practical implementation of a Poisson pulse train generator The idealized process described above is not well suited for a practical generation of a Poissonian pulse train, since, as can be seen from equation (48), at high values of the threshold D the rate of the generated train is highly sensitive to the changes in D. To reduce this sensitivity, one can pass the signal x(t) through a nonlinear amplifier, e.g., an antilogarithmic amplifier as shown in FIG. 27, thus transforming x(t) into the signal $y(t)=\exp[x(t)/\sigma]$. Then the average rate of the upward crossings of a threshold D by the signal y(t) can be written as $$R(D) = R_{max}\exp\left\{-\frac{1}{2}\left[\ln\left(\frac{D}{\sigma}\right)\right]^2\right\}, \quad (49)$$

which is much less sensitive to the relative errors in D.

Figure 28:
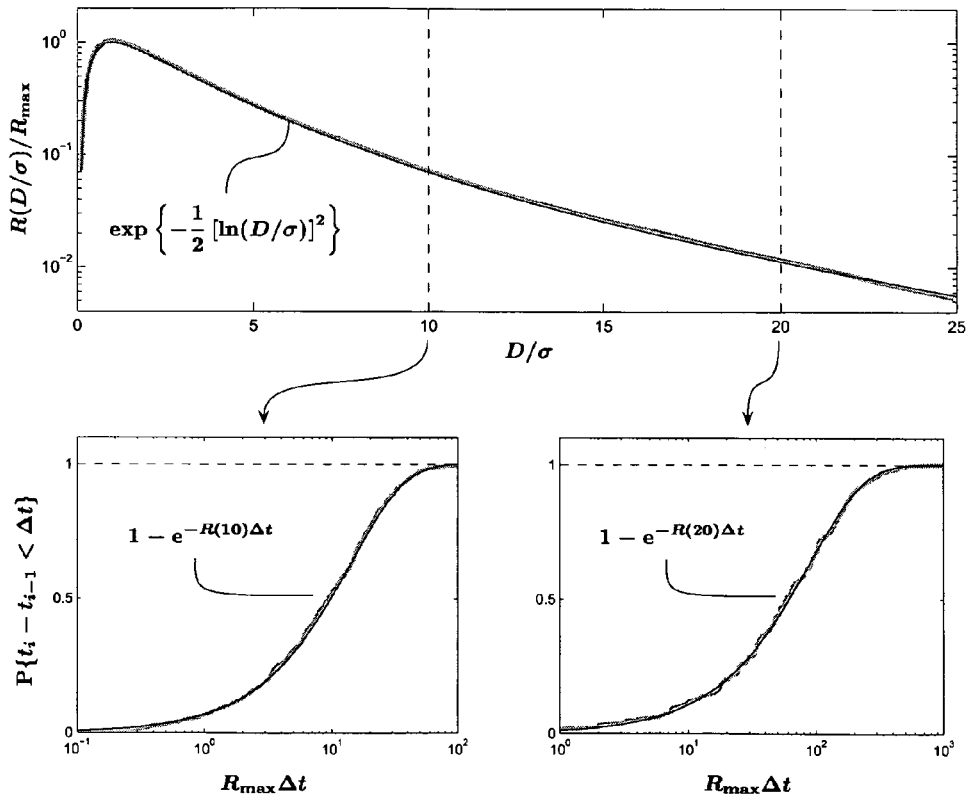
FIG. 28 Simulated performance of a monoenergetic Poisson pulse generator.

FIG. 28 illustrates a simulated performance of an idealized monoenergetic Poisson pulse generator shown in FIG. 27. The upper panel of FIG. 28 shows the output pulse rates as a function of threshold, and the lower panels show the distributions of the pulses' interarrival times for the generator set at two different threshold values. In the figure, the black solid lines show the theoretical curves, and the gray solid lines show the respective results of the simulations.

ARTICLES OF MANUFACTURE

Various embodiments of the invention may include hardware, firmware, and software embodiments, that is, may be wholly constructed with hardware components, programmed into firmware, or be implemented in the form of a computer program code.

Still further, the invention disclosed herein may take the form of an article of manufacture. For example, such an article of manufacture can be a computer-usable medium containing a computer-readable code which causes a computer to execute the inventive method.

REFERENCES

B. C. Arnold, N. Balakrishnan, and H. N. Nagaraja. *A First Course in Order Statistics*. John Wiley & Sons, Inc., 1992.

J. S. Bendat. *Nonlinear system techniques and applications*. Wiley, N.Y., 1998.

N. Bleistein and R. A. Handelsman. *Asymptotic Expansions of Integrals*. Dover, N.Y., 1986.

A. C. Bovik, T. S. Huang, and Jr. D. C. Munson. A generalization of median filtering using linear combinations of order statistics. *IEEE Trans. Acoust., Speech, Signal Processing*, ASSP-31:1342-1350, 1983.

A. S. Davydov. *Quantum Mechanics*. International Series in Natural Philosophy. Pergamon Press, 2nd edition, 1988. Second Russian Edition published by Nauka, Moscow, 1973.

P. J. S. G. Ferreira. Sorting continuous-time signals and the analog median filter. *IEEE Signal Processing Letters*, 7(10):281-283, 2000.

P. J. S. G. Ferreira. Sorting continuous-time signals: Analog median and median-type filters. *IEEE Trans. Signal Processing*, 49(11): 2734-2744, November 2001.

V. Kim and L. Yaroslavsky. Rank algorithms for picture processing. *Computer Vision, Graphics and Image Processing*, 35:234-258, 1986.

P. Kinget and M. Steyaert. *Analog VLSI integration of massive parallel processing systems*. Kluwer, 1997.

C. L. Lee and C.-W. Jen. Binary partition algorithms and VLSI architectures for median and rank order filtering. *IEEE Transactions on Signal Processing*, 41(9):2937-2942, 1993.

C. Mead. *Analog VLSI and neural systems*. Addison-Wesley, 1989.

N. R. Murthy and M. N. S. Swamy. On the VLSI implementation of real-time order statistic filters. *IEEE Transactions on Signal Processing*, 40(5):1241-1252, 1992.

A. V. Nikitin. *Pulse Pileup Effects in Counting Detectors*. PhD thesis, University of Kansas, Lawrence, 1998.

A. V. Nikitin and R. L. Davidchack. Method and apparatus for analysis of variables. Geneva: World Intellectual Property Organization, International Publication Number WO 03/025512, 2003.

A. V. Nikitin and R. L. Davidchack. Signal analysis through analog representation. *Proc. R. Soc. Lond. A*, 459(2033): 1171-1192, 2003.

A. V. Nikitin, R. L. Davidchack, and T. P. Armstrong. The effect of pulse pile-up on threshold crossing rates in a system with a known impulse response. *Nucl. Instr. & Meth.*, A411:159-171, 1998.

A. V. Nikitin, R. L. Davidchack, and T. P. Armstrong. Analog multivariate counting analyzers. *Nucl. Instr. & Meth.*, A496(2-3):465-480, 2003.

E. Ochoa, J. P. Allebach, and D. W. Sweeney. Optical median filtering using threshold decomposition. *Applied Optics*, 26(2):252-260, January 1987.

I. E. Opris. *Analog Rank Extractors and Sorting Networks*. Ph.D. Thesis, Stanford University, CA, 1996.

I. Osorio, M. C. Frei, and S. B. Wilkinson. Real-time automated detection and quantitative analysis of seizures and short-term prediction of clinical onset. *Epilepsia*, 39(6): 615-627, 1998.

S. Paul and K. Hüper. Analog rank filtering. *IEEE Rans. Circuits Syst.-I*, 40(7):469-476, July 1993.

K. Urahama and T. Nagao. Direct analog rank filtering. *IEEE Trans. Circuits Syst.-I*, 42(7):385-388, July 1995.

S. Vlassis, K. Doris, S. Siskos, and I. Pitas. Analog implementation of erosion/dilation, median and order statistics filters. *Pattern Recognition*, 33(6):1023-1032, 2000.

I claim:

1. A method for signal processing operable to transform an input signal into an output signal, where said input signal is a physical signal and where said output signal is a physical signal, comprising the steps of:
    a. forming a plurality of outputs of delayed comparators by passing said input signal and a plurality of feedbacks of Offset Rank Filtered Signals through a respective plurality of said delayed comparators, said Offset Rank Filtered Signals having Offset Quantile Parameters;
    b. forming a first difference which is a weighted difference of said outputs of the delayed comparators;
    c. forming a Density Function by time averaging said first difference;
    d. forming a second difference which is a weighted difference of said feedbacks of the Offset Rank Filtered Signals;
    e. forming a plurality of differences between the outputs of the delayed comparators and the respective Offset Quantile Parameters of said Offset Rank Filtered Signals;
    f. forming a plurality of time derivatives of said Offset Rank Filtered Signals by multiplying each of said plurality of differences by a ratio of said second difference and said Density Function;
    g. producing the plurality of said Offset Rank Filtered Signals by time-integrating said plurality of time derivatives; and
    h. producing said output signal as a weighted average of said Offset Rank Filtered Signals.

2. A method for signal processing as recited in claim 1 wherein:
    a. said plurality of outputs of delayed comparators consists of two outputs and said plurality of feedbacks of Offset Rank Filtered Signals consists of two feedbacks and said plurality of said delayed comparators consists of two delayed comparators;
    b. said first difference is a difference of said two outputs of said two delayed comparators;
    c. said second difference is a difference of said two feedbacks;
    d. said plurality of differences consists of two differences;
    e. said plurality of time derivatives consists of two time derivatives;
    f. said plurality of the Offset Rank Filtered Signals consists of two Offset Rank Filtered Signals; and
    g. said weighted average of said Offset Rank Filtered Signals is an average of said two Offset Rank Filtered Signals.

3. A method for signal processing operable to transform a plurality of input signals into an output signal, where said input signals are physical signals and where said output signal is a physical signal, comprising the steps of:
    a. forming a plurality of outputs of averaging comparators by passing said plurality of input signals and a plurality of feedbacks of Offset Rank Selected Signals through a plurality of said averaging comparators, said Offset Rank Selected Signals having Offset Quantile Parameters;
    b. forming a first difference which is a weighted difference of said outputs of the averaging comparators;
    c. forming a Density Function by time averaging said first difference;

d. forming a second difference which is a weighted difference of said feedbacks of the Offset Rank Selected Signals;

e. forming a plurality of differences between the outputs of the averaging comparators and the respective Offset Quantile Parameters of said Offset Rank Selected Signals;

f. forming a plurality of time derivatives of said Offset Rank Selected Signals by multiplying each of said plurality of differences by a ratio of said second difference and said Density Function;

g. producing the plurality of said Offset Rank Selected Signals by time-integrating said plurality of the time derivatives; and h. producing said output signal as a weighted average of said Offset Rank Selected Signals.

4. A method for signal processing as recited in claim 3 wherein:

a. said plurality of outputs of averaging comparators consists of two outputs and said plurality of feedbacks of Offset Rank Selected Signals consists of two feedbacks and said plurality of said averaging comparators consists of two averaging comparators;

b. said first difference is a difference of said two outputs of said two averaging comparators;

c. said second difference is a difference of said two feedbacks;

d. said plurality of differences consists of two differences;

e. said plurality of time derivatives consists of two time derivatives;

f. said plurality of the Offset Rank Selected Signals consists of two Offset Rank Selected Signals; and g. said weighted average of said Offset Rank Selected Signals is an average of said two Offset Rank Selected Signals.

5. A method for image processing operable to transform an input image signal into an output signal, where said input signal is a physical signal and where said output signal is a physical signal, comprising the steps of:

a. forming a plurality of outputs of delayed comparators by passing said input image signal and a plurality of feedbacks of Offset Rank Filtered Signals through a respective plurality of said delayed comparators, said Offset Rank Filtered Signals having Offset Quantile Parameters;

b. forming a first difference which is a weighted difference of said outputs of the delayed comparators;

c. forming a Density Function by time averaging said first difference;

d. forming a second difference which is a weighted difference of said feedbacks of the Offset Rank Filtered Signals;

e. forming a plurality of differences between the outputs of the delayed comparators and the respective Offset Quantile Parameters of said Offset Rank Filtered Signals;

f. forming a plurality of time derivatives of said Offset Rank Filtered Signals by multiplying each of said plurality of differences by a ratio of said second difference and said Density Function;

g. producing the plurality of said Offset Rank Filtered Signals by time-integrating said plurality of time derivatives; and h. producing said output signal as a weighted average of said Offset Rank Filtered Signals.

6. A method for image processing as recited in claim 5 wherein:

a. said plurality of outputs of delayed comparators consists of two outputs and said plurality of feedbacks of Offset Rank Filtered Signals consists of two feedbacks and said plurality of said delayed comparators consists of two delayed comparators;

b. said first difference is a difference of said two outputs of said two delayed comparators;

c. said second difference is a difference of said two feedbacks;

d. said plurality of differences consists of two differences;

e. said plurality of time derivatives consists of two time derivatives;

f. said plurality of the Offset Rank Filtered Signals consists of two Offset Rank Filtered Signals; and g. said weighted average of said Offset Rank Filtered Signals is an average of said two Offset Rank Filtered Signals.

7. A method for image processing operable to transform a plurality of input image signals into an output signal, where said input signals are physical signals and where said output signal is a physical signal, comprising the steps of:

a. forming a plurality of outputs of averaging comparators by passing said plurality of input image signals and a plurality of feedbacks of Offset Rank Selected Signals through a plurality of said averaging comparators, said Offset Rank Selected Signals having Offset Quantile Parameters;

b. forming a first difference which is a weighted difference of said outputs of the averaging comparators;

c. forming a Density Function by time averaging said first difference;

d. forming a second difference which is a weighted difference of said feedbacks of the Offset Rank Selected Signals;

e. forming a plurality of differences between the outputs of the averaging comparators and the respective Offset Quantile Parameters of said Offset Rank Selected Signals;

f. forming a plurality of time derivatives of said Offset Rank Selected Signals by multiplying each of said plurality of differences by a ratio of said second difference and said Density Function;

g. producing the plurality of said Offset Rank Selected Signals by time-integrating said plurality of the time derivatives; and h. producing said output signal as a weighted average of said Offset Rank Selected Signals.

8. A method for image processing as recited in claim 7 wherein:

a. said plurality of outputs of averaging comparators consists of two outputs and said plurality of feedbacks of Offset Rank Selected Signals consists of two feedbacks and said plurality of said averaging comparators consists of two averaging comparators;

b. said first difference is a difference of said two outputs of said two averaging comparators;

c. said second difference is a difference of said two feedbacks;

d. said plurality of differences consists of two differences;

e. said plurality of time derivatives consists of two time derivatives;

f. said plurality of the Offset Rank Selected Signals consists of two Offset Rank Selected Signals; and g. said weighted average of said Offset Rank Selected Signals is an average of said two Offset Rank Selected Signals.

9. An apparatus for signal processing operable to transform an input Signal into an output signal, where said input signal is a physical signal and where said output signal is a physical signal, comprising:
  a. a plurality of delayed comparators operable to form a plurality of outputs by passing said input signal and a plurality of feedbacks of Offset Rank Filtered Signals through said plurality of delayed comparators, said Offset Rank Filtered Signals having Offset Quantile Parameters;
  b. a component operable to form a first difference which is a weighted difference of said outputs of said plurality of delayed comparators;
  c. a component operable to form a Density Function by time averaging said first difference;
  d. a component operable to form a second difference which is a weighted difference of said feedbacks of the Offset Rank Filtered Signals;
  e. a component operable to form a plurality of differences between the outputs of said plurality of delayed comparators and the respective Offset Quantile Parameters of said Offset Rank Filtered Signals;
  f. a component operable to form a plurality of time derivatives of said Offset Rank Filtered Signals by multiplying each of said plurality of differences by a ratio of said second difference and said Density Function;
  g. a component operable to produce the plurality of said Offset Rank Filtered Signals by time-integrating said plurality of time derivatives; and
  h. a component operable to produce said output signal as a weighted average of said Offset Rank Filtered Signals.

10. An apparatus for signal processing as recited in claim 9 wherein:
  a. said plurality of delayed comparators consists of two delayed comparators and said plurality of outputs consists of two outputs and said plurality of feedbacks of Offset Rank Filtered Signals consists of two feedbacks;
  b. said first difference is a difference of said two outputs of said two delayed comparators;
  c. said second difference is a difference of said two feedbacks;
  d. said plurality of differences consists of two differences;
  e. said plurality of time derivatives consists of two time derivatives;
  f. said plurality of the Offset Rank Filtered Signals consists of two Offset Rank Filtered Signals; and
  g. said weighted average of said Offset Rank Filtered Signals is an average of said two Offset Rank Filtered Signals.

11. An apparatus for signal processing operable to transform a plurality of input signals into an output signal, where said input signals are physical signals and where said output signal is a physical signal, comprising:
  a. a plurality of averaging comparators operable to form a plurality of outputs by passing said plurality of input signals and a plurality of feedbacks of Offset Rank Selected Signals through said plurality of averaging comparators, said Offset Rank Selected Signals having Offset Quantile Parameters;
  b. a component operable to form a first difference which is a weighted difference of said outputs of the averaging comparators;
  c. a component operable to form a Density Function by time averaging said first difference;
  d. a component operable to form a second difference which is a weighted difference of said feedbacks of the Offset Rank Selected Signals;
  e. a component operable to form a plurality of differences between the outputs of said plurality of averaging comparators and the respective Offset Quantile Parameters of said Offset Rank Selected Signals;
  f. a component operable to form a plurality of time derivatives of said Offset Rank Selected Signals by multiplying each of said plurality of differences by a ratio of said second difference and said Density Function;
  g. a component operable to produce the plurality of said Offset Rank Selected Signals by time-integrating said plurality of the time derivatives; and
  h. a component operable to produce said output signal as a weighted average of said Offset Rank Selected Signals.

12. An apparatus for signal processing as recited in claim 11 wherein:
  a. said plurality of said averaging comparators consists of two averaging comparators and said plurality of outputs consists of two outputs and said plurality of feedbacks of Offset Rank Selected Signals consists of two feedbacks;
  b. said first difference is a difference of said two outputs of said two averaging comparators;
  c. said second difference is a difference of said two feedbacks;
  d. said plurality of differences consists of two differences;
  e. said plurality of time derivatives consists of two time derivatives;
  f. said plurality of the Offset Rank Selected Signals consists of two Offset Rank Selected Signals; and
  g. said weighted average of said Offset Rank Selected Signals is an average of said two Offset Rank Selected Signals.

\* \* \* \* \*